US012726780B2

(12) United States Patent
Kimura et al.

(10) Patent No.: US 12,726,780 B2
(45) Date of Patent: Sep. 1, 2026

(54) INFORMATION PROCESSING DEVICE AND METHOD

(71) Applicant: SONY GROUP CORPORATION, Tokyo (JP)

(72) Inventors: Kentaro Kimura, Tokyo (JP); Junya Suzuki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 161 days.

(21) Appl. No.: 18/575,889

(22) PCT Filed: Feb. 25, 2022

(86) PCT No.: PCT/JP2022/007804

§ 371 (c)(1),
(2) Date: Jan. 2, 2024

(87) PCT Pub. No.: WO2023/286320

PCT Pub. Date: Jan. 19, 2023

(65) Prior Publication Data

US 2024/0340605 A1 Oct. 10, 2024

(30) Foreign Application Priority Data

Jul. 12, 2021 (JP) ................................ 2021-115101

(51) Int. Cl.
*H04S 7/00* (2006.01)
*H04S 3/00* (2006.01)

(52) U.S. Cl.
CPC ................ *H04S 7/303* (2013.01); *H04S 7/40* (2013.01)

(58) Field of Classification Search
None
See application file for complete search history.

(56) References Cited

U.S. PATENT DOCUMENTS

2014/0129937 A1* 5/2014 Jarvinen ................ G06F 3/165 715/716
2015/0055770 A1* 2/2015 Spittle .................. H04M 3/568 379/202.01

(Continued)

FOREIGN PATENT DOCUMENTS

EP 3582511 A2 * 12/2019 ............ H04S 7/306
JP 2006-025281 A 1/2006
JP 2006-140595 A 6/2006

OTHER PUBLICATIONS

International Search Report and Written Opinion of PCT Application No. PCT/JP2022/007804, issued on May 10, 2022, 09 pages of ISRWO.

(Continued)

*Primary Examiner* — Qin Zhu
(74) *Attorney, Agent, or Firm* — CHIP LAW GROUP

(57) ABSTRACT

Provided is an information processing device and method that allow the voice of a speaker to be easily recognized. The information processing device includes an information processing unit that generates, on the basis of orientation information indicating an orientation of a listener, virtual location information indicating a location of the listener in a virtual space, the location being set by the listener, and virtual location information of a speaker, a voice of the speaker localized at a location corresponding to the orientation and location of the listener and the location of the speaker.

16 Claims, 24 Drawing Sheets

(56) References Cited

U.S. PATENT DOCUMENTS

| | | | | |
|---|---|---|---|---|
| 2018/0343534 | A1* | 11/2018 | Norris | G06V 40/172 |
| 2022/0326904 | A1* | 10/2022 | Leppänen | H04S 7/302 |
| 2023/0008964 | A1* | 1/2023 | Fernandez Guajardo | H04L 12/1827 |
| 2024/0064485 | A1* | 2/2024 | Perlmutter | H04S 3/008 |
| 2025/0220386 | A1* | 7/2025 | Norris | H04S 1/007 |

OTHER PUBLICATIONS

OVice, Jul. 6, 2021, URL: https://ovice.in/ja/.

* cited by examiner

INFORMATION PROCESSING DEVICE AND METHOD

CROSS REFERENCE TO RELATED APPLICATIONS

This application is a U.S. National Phase of International Patent Application No. PCT/JP2022/007804 filed on Feb. 25, 2022, which claims priority benefit of Japanese Patent Application No. JP 2021-115101 filed in the Japan Patent Office on Jul. 12, 2021. Each of the above-referenced applications is hereby incorporated herein by reference in its entirety.

TECHNICAL FIELD

The present technology relates to an information processing device and method, and a program, and particularly relates to an information processing device and method, and a program that allow a voice of each speaker to be easily recognized.

BACKGROUND ART

With changes in modern work styles, communications on business such as teleconferences and telecommunications are on the increase. Furthermore, opportunities to communicate by voice while enjoying content such as a movie, a concert, or a game with connection established with others located at remote locations are also on the increase.

For example, as a technology concerning telecommunications, a technology has been proposed in which, with an icon of a user displayed on a display, the orientation of the user is set by dragging the icon with a cursor, and a range in which a voice reaches becomes wider as the user is in front of the direction (see, for example, Non-Patent Document 1).

CITATION LIST

Non-Patent Document

Non-Patent Document 1: oVice, [online], [searched on Jul. 6, 2021], Internet <URL: https://ovice.in/ja/>

SUMMARY OF THE INVENTION

Problems to be Solved by the Invention

However, while remote connection with others is convenient, all the voices of speakers are reproduced in monaural; therefore, in a multi-person environment, it is difficult to make a quick response, a reaction, a casual talk, an utterance, or the like that is typically made in face-to-face communications.

Specifically, for example, in a case of monaural voices, voices of a plurality of speakers are likely to overlap and cause difficulty in hearing. That is, there is a case where it is difficult to recognize each of the voices of the plurality of speakers. It is therefore necessary to devise a method such as speaking at the right timing to avoid overlapping with others.

The present technology has been made in view of such circumstances, and it is therefore an object of the present technology to allow a voice of each speaker to be easily recognized.

Solutions to Problems

An information processing device according to one aspect of the present technology includes an information processing unit configured to generate, on the basis of orientation information indicating an orientation of a listener, virtual location information indicating a location of the listener in a virtual space, the location being set by the listener, and virtual location information of a speaker, a voice of the speaker localized at a location corresponding to the orientation and location of the listener and the location of the speaker.

An information processing method or program according to one aspect of the present technology includes generating, on the basis of orientation information indicating an orientation of a listener, virtual location information indicating a location of the listener in a virtual space, the location being set by the listener, and virtual location information of a speaker, a voice of the speaker localized at a location corresponding to the orientation and location of the listener and the location of the speaker.

In one aspect of the present technology, on the basis of the orientation information indicating the orientation of the listener, the virtual location information indicating the location of the listener in the virtual space, the location being set by the listener, and the virtual location information of the speaker, the voice of the speaker localized at a location corresponding to the orientation and location of the listener and the location of the speaker is generated.

MODE FOR CARRYING OUT THE INVENTION

Hereinafter, an embodiment to which the present technology is applied will be described with reference to the drawings.

First Embodiment

About Present Technology

The present technology causes a sound image of a voice of a speaker to be localized at a location on the basis of a location of a listener set by the listener in a virtual space, an orientation of the listener, and a location of the speaker in the virtual space, thereby allowing the voice of the speaker to be easily recognized.

As described above, while remote connection with others is convenient, all the voices of speakers are reproduced in monaural; therefore, in a multi-person environment, it is difficult to make a quick response, a reaction, a casual talk, an utterance, or the like that is typically made in face-to-face communications.

Specifically, for example, there is room for improvement in the following points.

(1) Monaural voices are likely to cause difficulty in hearing due to overlapping of voices of a plurality of speakers, and it is therefore necessary to devise a method to speak at the right timing to avoid overlapping with voices of the other speakers.

(2) When the speaker does not speak, the speaker mutes or prevents his/her voice from entering, so that the speaker does not know the reaction of a listener such as a quick response or a reply, and the communication density is reduced.

(3) Due to the lack of information regarding a positional relation among persons, it is difficult to communicate with others because the connection, the direction, or the relation of communications between speakers based on their locations are unknown.

For the current multi-party voice conferences, voices are typically rendered into a monaural audio stream for all listeners. That is, the voices of a plurality of speakers overlap each other, and for example, when headphones are used, the voices of the speakers are generally presented to their heads of the listeners.

For example, the use of a spatialization technique used to simulate the voices of speakers from different rendering positions can improve speech intelligibility, particularly when there is a plurality of speakers in a voice conference.

The present technology therefore addresses a technical challenge of designing a suitable two-dimensional (2D) or three-dimensional (3D) tele-communication space for tele-communications that allows a listener to easily distinguish between different speakers in tele-communications using audio.

That is, in the present technology, stereophonic sound is used to individually arrange the voices of speakers in a space, so that the cocktail party effect that is a human cognitive ability can be applied, and the point that there is room for improvement described above can be improved.

The cocktail party effect makes it possible to recognize each of a plurality of voices that is simultaneously heard and to listen to a voice to which attention is paid even in a noisy environment.

Figure 1:
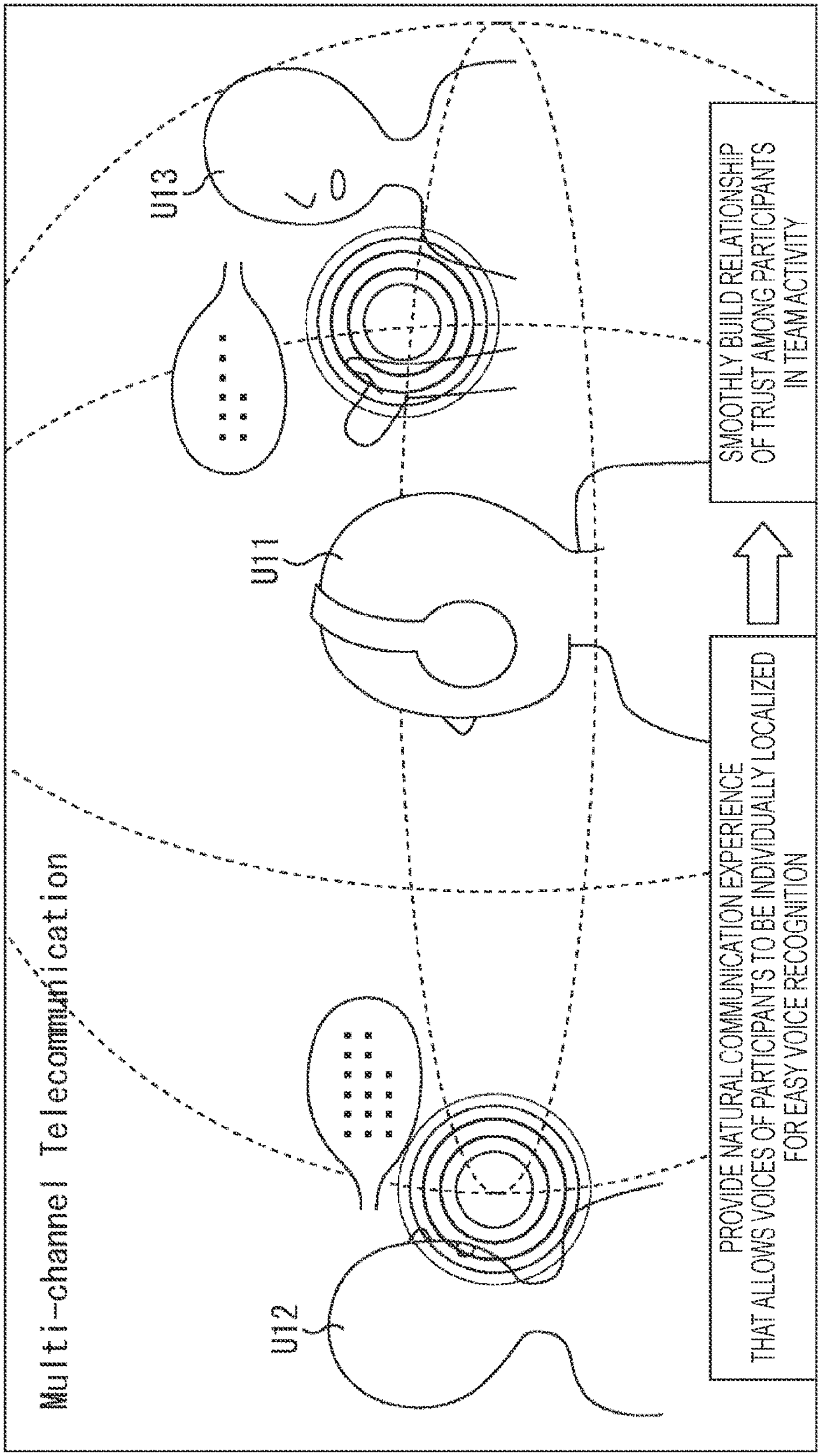
FIG. 1 is a diagram for describing tele-communications using stereophonic sound.

Therefore, for example, as illustrated in FIG. 1, even if participants in tele-communications simultaneously speak, it is possible to realize a communication space in which a speaker can be easily recognize the voice of each of the participants.

In the example in FIG. 1, three users U11 to U13 are in tele-communications using stereophonic sound in a virtual communication space. In particular, in this example, a multiple circle represents a sound image localization location of a spoken voice, and the spoken voice of the user U12 who is a speaker and the spoken voice of the user U13 are localized at different locations by stereophonic sound. It is therefore possible for the user U11 who is a listener to easily recognize each of the spoken voices.

When it becomes possible to recognize each voice, there is no hesitation in overlapping of voices, that is, occurrence of a plurality of voices at the same time, and it is therefore possible to solve the points (1) and (2) in which there is room for improvement described above.

Furthermore, regarding the point (3) in which there is room for improvement described above, the listener side can easily make a reaction such as a quick response, so that an effect of improving the bidirectionality of communication can be obtained.

Features of the present technology for realizing remote communications using stereophonic sound will be described below.

(Feature 1)

Speculative Stereophonic Sound Rendering

A first feature (feature 1) of the present technology is to realize multiple real-time body tracking by means of generation/distribution of streams in a plurality of directions in advance when a time lag occurs between stereophonic sound processing and reproduction timing, such as when stereophonic sound rendering is performed on the server side.

For example, rotating, in accordance with a change in orientation of the head of the user who is a listener, the location of the sound image of voices of another user who is a speaker in a direction opposite to the rotation direction of the head of the listener allows the direction of voices of the speaker to be fixed on spatial coordinates.

In such a processing system for rotating the location of a sound image, a short delay from the occurrence of the change in orientation of the head of the listener to the reproduction of a sound after the change in orientation of the head is a very important factor in naturalness of experience.

Further, a memory having a large capacity and a central processing unit (CPU) capable of performing processing at a high speed are required for stereophonic sound processing, so that there are many use cases that require the server side rich in computing resources to have a stereophonic sound processing function.

For example, the use cases may include a case where a user uses a TV, a website, a low performance terminal, that is, a low spec terminal, a low-power consumption terminal, or the like.

In such a case, the terminal of each user transmits information regarding the orientation and location of the user, spoken voices, and the like to the server, receives the voices of the other users from the server, and reproduces the received voices in its own terminal.

However, before the voices of the other users are reproduced in the terminal of the user, processes such as a process of transmitting information regarding the orientation of the face of the user and the location of the user to the server, a process of receiving a voice stream obtained as a result of stereophonic sound processing from the server, a process of allocating a buffer, and the like are performed. Furthermore, while these processes are running, the orientation of the face of the user or the location of the user may change.

Figure 2:
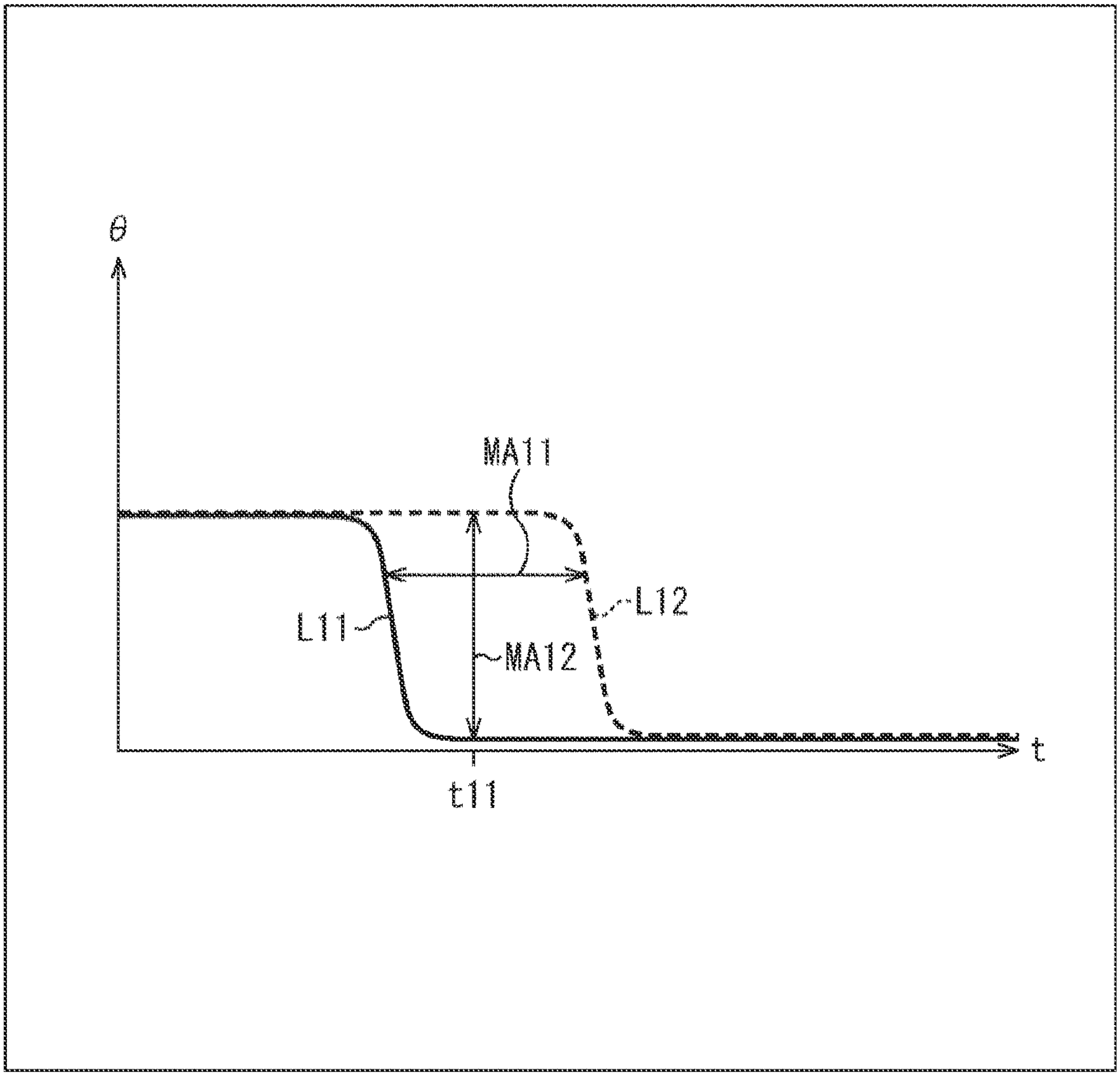
FIG. 2 is a diagram for describing a difference in orientation of a listener due to a delay.

Therefore, for example, as illustrated in FIG. 2, there is a case where a large delay exceeding 100 ms occurs between the change in orientation of the face of the user or location of the face of the user and the start of the reproduction of the voices of the other users received from the server after the change.

Note that, in FIG. 2, the horizontal axis represents time, and the vertical axis represents an angle indicating a direction in which the face of the user faces, that is, the orientation of the face of the user.

In this example, a curve L11 indicates time-series changes in actual orientation of the face of the user. Furthermore, a curve L12 indicates the orientation of the face of the user used in rendering the voices of the other users to be reproduced, that is, time-series changes in orientation of the face of the user at the time of rendering stereophonic sounds to be reproduced.

A result of comparison between the curve L 11 and the curve L 12 shows that there is a delay MA11 in orientation of the face of the user between the curve L11 and the curve L12. Therefore, for example, at time t11, there is a misalignment by a difference MA12 between the actual orientation of the face of the user and the orientation of the face of the user in rendering the voices to be reproduced, and this misalignment is an angle misalignment perceived by the user.

Furthermore, in a case where a delay occurs between the stereophonic sound processing and the reproduction of the voices, an event similar to the above-described example using the server occurs in an environment other than the server.

Therefore, in the present technology, stereophonic sound is rendered for the orientations of a plurality of faces of listeners on the server side. Furthermore, the client performs, on the basis of a change in angle indicating the orientation of the face of the user that has occurred during the delay time, MIX processing (addition processing) on received voices for each of the plurality of orientations at a ratio based on vector base amplitude panning (VBAP) or the like.

By doing so, it is possible to generate voices with consideration given to the delay time occurring due to the intervention of the server. Note that, even in a case where rendering is performed by a device other than the server, when the delay time occurs, compensation for the delay can be similarly made.

(Feature 2)

Selective Speaking and Selective Listening

A second feature of the present technology is to realize, in a tele-communication space, radiation characteristics of spoken voices and characteristics of a listening direction in which frequency characteristics, a sound pressure, and an apparent sound width during listening are changed by signal processing in real-time synchronization with the orientations of the faces of the speaker and the listener and the positional relation between the speaker and the listener. In other words, the second feature of the present technology is to realize selective speaking and selective listening.

Although the stereophonic sound makes voices easy to recognize, when the voices of a plurality of speakers are equally transmitted (received) from all directions, the ease of recognition of the voices is reduced.

Therefore, in the present technology, when the listener turns toward voices that the listener wants to listen to, that is, toward the speaker who has output the voices that the listener wants to listen to, expression that makes the voices in front clear is realized. Hereinafter, such expression during sound reproduction is also referred to as selective listening.

In the selective listening, acoustic processing is also performed such that voices coming from a direction other than the front of the listener sound like a muffled sound low in volume, in other words, a sound with a low sound pressure in the mid- to high-frequency range, or a hollow sound, that is, a sound with a low sound pressure in the mid- to low-frequency range as a sound source location of the voices (the location of the speaker) comes closer to right behind the listener.

Furthermore, due to the stereophonic sound, a plurality of participants is arranged in one tele-communication space, and it is possible to recognize who is speaking, but it is not possible to express who the speaker is speaking to.

Therefore, when speaking to a specific person, the speaker needs to consciously call a name like "What do you think about this? Mr. XX.".

Therefore, in the present technology, the radiation characteristics of the voices spoken by the speaker are reproduced, and if the speaker faces a certain listener, an expression that allows the listener to clearly hear the voices of the speaker is realized. Hereinafter, such an expression during voice reproduction is also referred to as selective speaker.

In the selective speaking, acoustic processing is also performed such that the voices of the speaker sound like a muffled sound low in volume (sound with a low sound pressure in the mid- to high-frequency range), or a hollow sound (sound with a low sound pressure in the mid- to low-frequency range) as the speaker no longer faces the listener, that is, as the speaker faces a direction away from the speaker.

(Feature 3)

Automatic arrangement adjustment of dense sound image and priority adjustment of automatic arrangement according to speaking frequency A third feature of the present technology is to realize automatic control of a voice presentation location on the basis of a minimum interval (angle) for a plurality of spoken voice presentations so as to maintain the ease of recognition of voices even in a case where speakers are densely located.

In a case where the user who is a speaker or a listener can control (determine) the location of the speaker or the listener in a virtual communication space, if speakers are densely arranged or a plurality of speakers and a plurality of listeners are arranged in a line, a plurality of spoken voices is presented to the listener as if coming from the same direction. This reduces the ease of recognition of the voices spoken by the speaker.

Therefore, in the present technology, arrival directions of a plurality of spoken voices as viewed from a listener himself/herself are compared, and an interval between the arrangement locations of speakers in the virtual communication space is automatically adjusted so as to prevent an angle formed by the arrival directions from falling below a preset minimum interval (angle). That is, the automatic arrangement adjustment of dense sound images is performed. By doing so, it is possible to continue tele-communications while maintaining the ease of recognition of voices.

However, even if such an arrangement location adjustment is made, in a situation where the number of participants in the tele-communications is large, if an attempt is made to secure a user interval between all the participants, the arrangement location of the user (speaker) after the adjustment may be greatly deviated from the original arrangement location. Furthermore, there may be no space in which all the users can be arranged at constant intervals in the virtual communication space in the first place.

Therefore, in the present technology, in a case where the automatic arrangement adjustment of dense sound images cannot be appropriately performed, for example, in a case where the number of participants is large, the automatic arrangement adjustment based on the priority according to the speaking frequency is further performed.

In this case, for example, the communication frequency is analyzed for a communication group including one or a plurality of users (participants) or for each speaker, and a communication group or a speaker having a higher communication frequency takes precedence (given a higher degree of priority) over the other communication groups or speakers such that the intervals between the users can be secured, and the other communication groups or speakers are lower in degree of priority. Then, the arrangement location of each user in the virtual communication space is adjusted so as to keep a voice with a higher degree of priority, that is, a voice of a communication group or a speaker with a higher degree of priority, in a recognizable state by selecting a voice that needs to secure the minimum interval in accordance with the assigned degree of priority.

<Configuration Example of Tele-Communication System>

Figure 3:
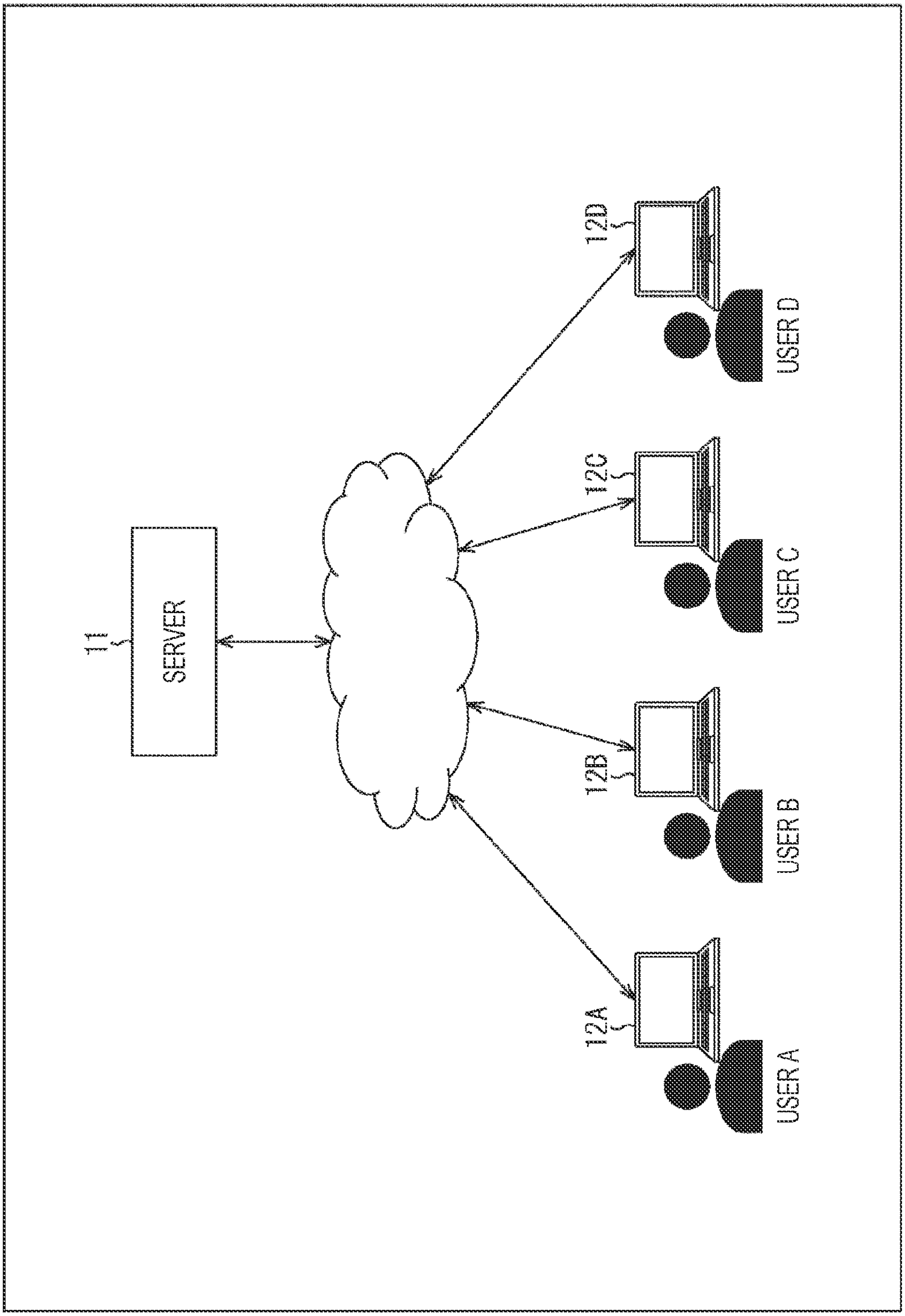
FIG. 3 is a diagram illustrating a configuration example of a tele-communication system.

FIG. 3 is a diagram illustrating a configuration example of an embodiment of a tele-communication system to which the present technology is applied.

This tele-communication system includes a server 11 and clients 12A to 12D, and the server 11 and the clients 12A to 12D are connected to each other over a network such as the Internet.

Furthermore, the clients 12A to 12D are illustrated herein as information processing devices (terminal devices) such as personal computers (PCs) used by users A to D who are participants in tele-communications.

Note that the number of participants in the tele-communications (the number of participants) is not limited to four, and may be any number as long as the number is greater than or equal to two.

Furthermore, in a case where it is not particularly necessary to distinguish the clients 12A to 12D, the clients are also simply referred to as client 12 hereinafter. Similarly, in a case where it is not particularly necessary to distinguish the users A to D, the users A to D are also simply referred to as user hereinafter.

In particular, among the users, a user who is speaking is also referred to as speaker (utterer), and a user who is listening to a spoken voice of another user is also referred to as listener.

In the tele-communication system, each user wears a voice output device such as headphones, stereo earphones (inner ear headphones), or open ear (open type) earphones that do not cover earholes, and participates in tele-communications.

The voice output device may be provided as a part of the client 12, or may be connected to the client 12 in a wired or wireless manner.

The server 11 manages online communications (tele-communications) held by a plurality of users. In other words, in the tele-communication system, one server 11 is provided as a data relay hub for tele-communications.

The server 11 receives, from the client 12, a voice spoken by the user and orientation information indicating the orientation (direction) of the face of the user. Furthermore, the server 11 performs stereophonic sound rendering processing on the received voice, and transmits a voice obtained as a result of the stereophonic sound rendering processing to the client 12 of the user who is a listener.

Specifically, for example, in a case where the user A speaks, the server 11 performs stereophonic sound rendering processing on the basis of the spoken voice of the user A received from the client 12A, and generates a voice that sounds as if the sound image is localized at a location where the user A is arranged in a virtual communication space. At this time, the voice of the user A is generated for each user serving as a distribution destination. Then, the server 11 transmits the generated spoken voice of the user A to the clients 12B to 12D.

Then, the clients 12B to 12D reproduce the spoken voice of the user A received from the server 11. This allows the users B to D to listen to the spoken voice of the user A.

Note that, more specifically, in the server 11, the above-described speculative stereophonic sound rendering or the like is performed for each user serving as a distribution destination (transmission destination) of the spoken voice of the user A to generate the spoken voice of the user A to be presented to the user who is a listener.

Furthermore, in the clients 12B to 12D, a voice of the user A for final presentation is generated on the basis of the voice of the user A received from the server 11, and the voice of the user A for final presentation is presented to the users B to D.

The spoken voice of the user who is a speaker as described above is transmitted to the clients 12 of the other users via the server 11, and the spoken voice is reproduced. By dosing so, the tele-communication system realizes the tele-communications among the users A to D.

Note that the voice obtained as a result of the stereophonic sound rendering processing performed by the server 11 on the basis of the voice received from the client 12 is also referred to as rendering voice hereinafter. Furthermore, the voice for final presentation generated on the basis of the rendering voice received by the client 12 from the server 11 is also referred to as presentation voice hereinafter.

The tele-communication system provides tele-communications imitating communications held among the users A to D in the virtual communication space.

Therefore, for example, the client 12 can display, as needed, a virtual communication space image imitating the virtual communication space in which communications among the users are held.

For example, an image representing a user such as an icon or an avatar corresponding to each user is displayed on the virtual communication space image. In particular, the image representing a user is displayed (arranged) at a location on the virtual communication space image corresponding to the location of the user in the virtual communication space. Therefore, it can be said that the virtual communication space image is an image indicating a positional relation among users (listener and speaker) in the virtual communication space.

Furthermore, both the rendering voice and the presentation voice are a voice of the speaker that sounds as if the sound image is localized at the location of the speaker as viewed from the listener in the virtual communication space. In other words, the sound image of the rendering voice or the presentation voice is localized at a location in accordance with the location of the listener in the virtual communication space, the orientation of the face of the listener, and the location of the speaker in the virtual communication space.

In particular, even in a case where a plurality of speakers speaks at the same time, the voices of the speakers are localized at locations of the speakers as viewed from the listener in the virtual communication space; therefore, if the speakers are arranged at different locations from each other in the virtual communication space, the listener can easily recognize the voice of each speaker.

<Configuration Example of Server>

Figure 4:
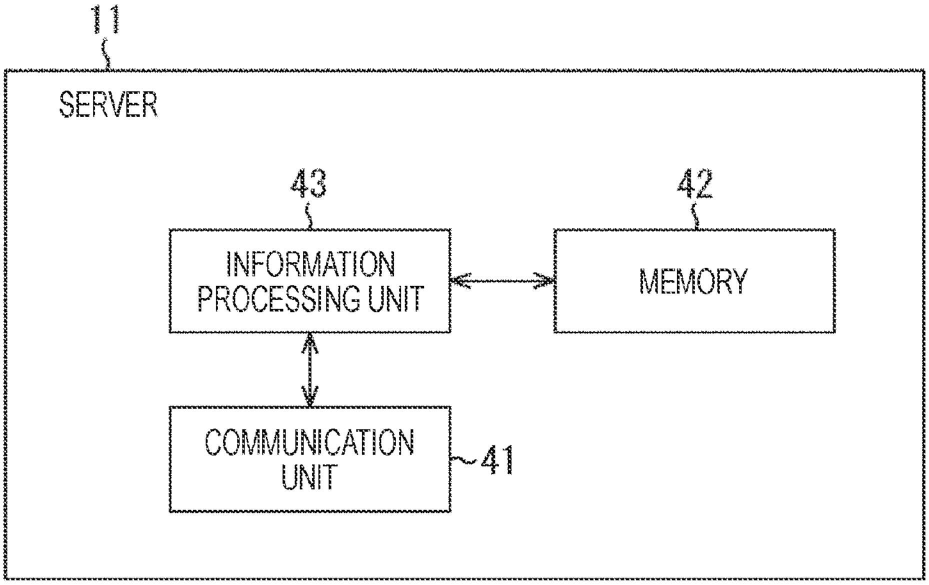
FIG. 4 is a diagram illustrating a configuration example of a server.

More specifically, the server 11 is configured as illustrated in FIG. 4, for example.

The server 11 is an information processing device, and includes a communication unit 41, a memory 42, and an information processing unit 43.

The communication unit 41 transmits a rendering voice supplied from the information processing unit 43, more specifically, voice data of the rendering voice, orientation information, and the like to the client 12 over the network.

Furthermore, the communication unit 41 receives a voice (voice data) of the user who is a speaker transmitted from the client 12, orientation information indicating the orientation of the face of the user, virtual location information indicating the location of the user in the virtual communication space, and the like, and supplies the voice, the orientation information, the virtual location information, and the like to the information processing unit 43.

The memory 42 records various types of data such as head-related transfer function (HRTF) data necessary for stereophonic sound rendering processing, and supplies the recorded data to the information processing unit 43 as necessary.

For example, the HRTF data is head-related transfer function (HRTF) data representing transfer characteristics of sound from any location that is a sound source location in the virtual communication space to any other location that is a listening location (listening point). In the memory 42, the HRTF data is recorded for each of a plurality of desired combinations of sound source locations and listening locations.

On the basis of the voice of the user, the orientation information, and the virtual location information supplied from the communication unit 41, the information processing unit 43 uses, as needed, the data supplied from the memory 42 to perform stereophonic sound rendering processing, in other words, speculative stereophonic sound rendering, or the like to generate a rendering voice.

<Configuration Example of Client>

Figure 5:
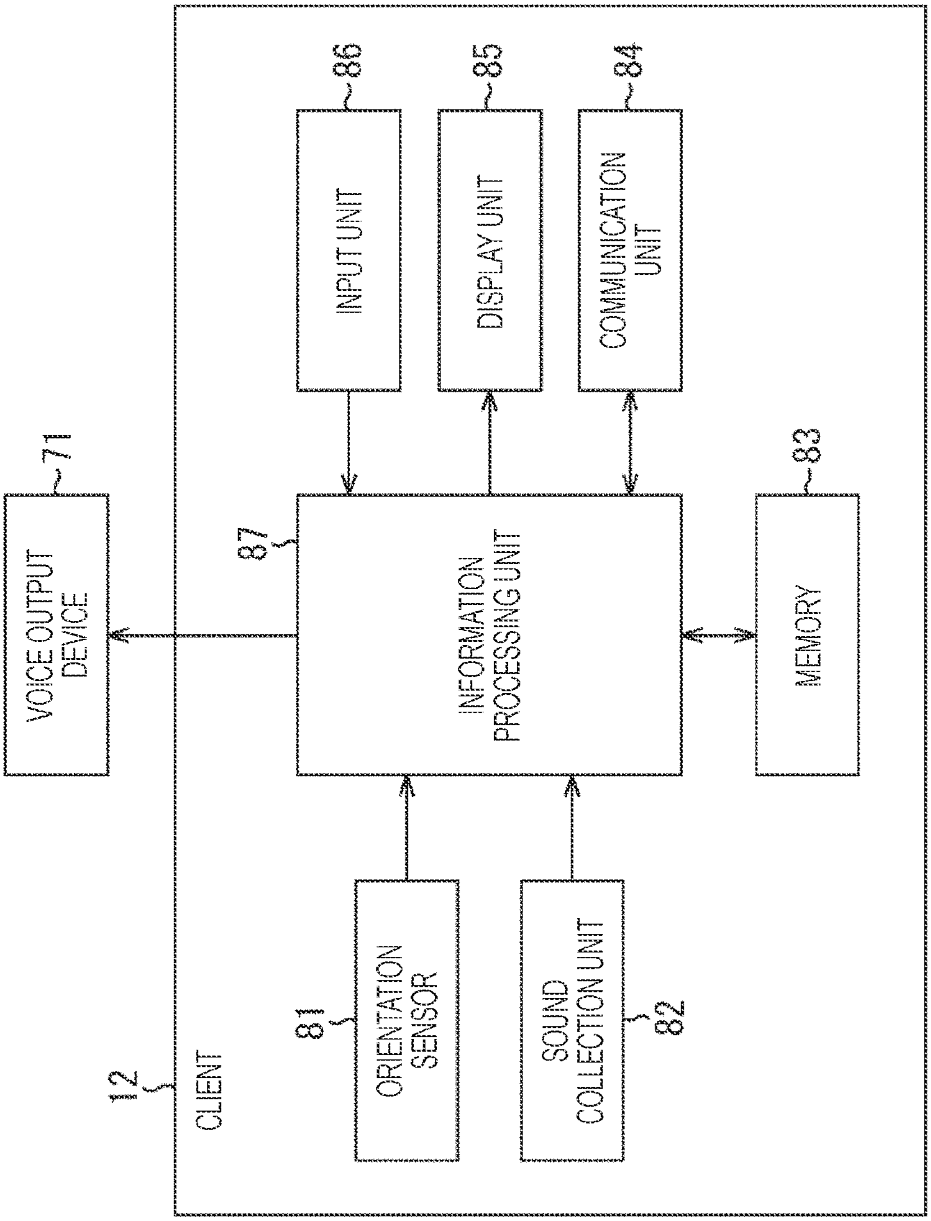
FIG. 5 is a diagram illustrating a configuration example of a client.

Furthermore, the client 12 is configured as illustrated in FIG. 5, for example.

Note that an example where a voice output device 71 that includes headphones or the like and is worn by the user is connected to the client 12 will be described herein, but the voice output device 71 may be provided integrally with the client 12.

The client 12 includes, for example, an information processing device such as a smartphone, a tablet terminal, a portable gaming console, or a PC.

The client 12 includes an orientation sensor 81, a sound collection unit 82, a memory 83, a communication unit 84, a display unit 85, an input unit 86, and an information processing unit 87.

The orientation sensor 81 includes, for example, a sensor such as a gyro sensor, an acceleration sensor, or an image sensor, detects the orientation of the user who carries (wears or has) the client 12, and supplies orientation information indicating the detection result to the information processing unit 87.

Note that the description will be continued below on the assumption that the orientation of the user detected by the orientation sensor 81 is the orientation of the face of the user, but the orientation of the body of the user or the like may be detected as the orientation of the user. Furthermore, for example, the orientation of the client 12 itself may be detected as the orientation of the user regardless of the actual orientation of the user.

The sound collection unit 82 includes a microphone, collects a sound around the client 12, and supplies a voice obtained as a result of the sound connection to the information processing unit 87. For example, since the user who carries the client 12 is located near the sound collection unit 82, when the user speaks, the spoken voice is collected by the sound collection unit 82.

Note that the spoken voice of the user obtained as a result of the sound collection (recording) by the sound collection unit 82 is also referred to as recorded voice hereinafter.

The memory 83 records various data, and supplies the recorded data to the information processing unit 87 as necessary. For example, when the above-described HRTF data is recorded in the memory 83, the information processing unit 87 can perform acoustic processing including binaural processing.

The communication unit 84 receives the rendering voice, the orientation information, and the like transmitted from the server 11 over the network, and supplies the rendering voice, the orientation information, and the like to the information processing unit 87. Furthermore, the communication unit 84 transmits the voice of the user, the orientation information, the virtual location information, and the like supplied from the information processing unit 87 to the server 11 over the network.

The display unit 85 includes, for example, a display, and displays any desired image such as the virtual communication space image supplied from the information processing unit 87.

The input unit 86 includes, for example, a touch panel, a switch, a button, and the like superimposed on the display unit 85, and when operated by the user, supplies a signal corresponding to the operation to the information processing unit 87.

For example, the user can input (set) his/her location in the virtual communication space by operating the input unit 86.

The location (arrangement location) of the user in the virtual communication space may be predetermined or may be input (set) by the user. In a case where the location of the user in the virtual communication space is set by the user himself/herself, virtual location information indicating the location of the user thus set is transmitted to the server 11.

Furthermore, the user may be allowed to set (designate) the location of a user other than the user in the virtual communication space. In such a case, virtual location information indicating the location, in the virtual communication space, of the other user set by the user is also transmitted to the server 11.

The information processing unit 87 controls the entire operation of the client 12. For example, the information processing unit 87 generates a presentation voice on the basis of the rendering voice and the orientation information supplied from the communication unit 84 and the orientation information supplied from the orientation sensor 81, and outputs the presentation voice to the voice output device 71.

Note that any desired information processing device such as a smartphone, a tablet terminal, a portable gaming console, or a PC may be used as the client 12.

Therefore, for example, some or all of the orientation sensor 81, the sound collection unit 82, the memory 83, the communication unit 84, the display unit 85, and the input unit 86 need not necessarily be provided in the client 12, and some or all of them may be provided outside the client 12.

For example, in a case where the smartphone serves as the client 12, the orientation sensor 81, the sound collection unit 82, the communication unit 84, and the information processing unit 87 may be provided in the client 12.

Furthermore, for example, the voice output device 71 may include headphones equipped with an orientation sensor including the orientation sensor 81 and the sound collection unit 82, and the voice output device 71 and a smartphone or a PC serving as the client 12 may be used in combination.

Moreover, smart headphones including the orientation sensor 81, the sound collection unit 82, the communication unit 84, and the information processing unit 87 may be used as the client 12.

For example, in the tele-communication system, the recorded voice, the orientation information, and the virtual location information obtained for the user corresponding to the client 12 are transmitted from each client 12 to the server 11. At this time, when the locations of the other users in the virtual communication space are also designated by the user, the virtual location information of the other users is also transmitted from the client 12 to the server 11.

The server 11 performs stereophonic sound rendering processing, that is, stereophonic sound localization processing (stereophonic sound processing) on the basis of the received various types of information such as the recorded voice, the orientation information, and the virtual location information to generate a rendering voice and broadcasts the rendering voice to the client 12.

For example, an example where the user A is a speaker, and a rendering voice corresponding to the recorded voice of the user A is generated for presentation to the user B who is a listener will be described.

In this case, the information processing unit 43 of the server 11 generates a rendering voice including the spoken voice of the user A on the basis of at least the recorded voice of the user A, the virtual location information of the user A, the orientation information of the user B, and the virtual location information of the user B.

At this time, in a case where the user B is allowed to designate the location of the user A in the virtual communication space, the virtual location information of the user A received from the client 12B corresponding to the user B is used for generation of the rendering voice to be presented to the user B.

On the other hand, in a case where the user B is not allowed to designate the location of the user A in the virtual communication space, and the location of the user A is designated by the user A himself/herself, the virtual location information of the user A received from the client 12A corresponding to the user A is used for generation of the rendering voice to be presented to the user B.

More specifically, the information processing unit 43 generates rendering voices including the spoken voice of the user A to be presented to the user B for a plurality of orientations including the orientation (direction) indicated by the received orientation information of the user B.

The server 11 transmits the rendering voice for each of the plurality of orientations and the orientation information of the user B to the client 12B.

The client 12B processes, as needed, the received rendering voice on the basis of the rendering voice for each of the plurality of orientations and the orientation information of the user B received from the server 11, and orientation information indicating the current orientation of the user B that has been newly acquired to generate a presentation voice. Here, the newly acquired orientation information of the user B is orientation information acquired later than the orientation information of the user B received from the server 11 together with the rendering voice.

The client 12B supplies the presentation voice thus acquired to the voice output device 71 as a final stereophonic voice including the spoken voice of the user A, and causes the voice output device 71 to output the presentation voice. This allows the user B to listen to the spoken voice of the user A.

Note that the server 11 performs processing in a manner similar to the processing for the user B to generate a rendering voice including the spoken voice of the user A to be presented to the user C and transmit the rendering voice to the client 12C together with the orientation information of the user C. Furthermore, a rendering voice including the spoken voice of the user A to be presented to the user D is generated and transmitted to the client 12D together with the orientation information of the user D.

The rendering voice to be presented to the user B, the rendering voice to be presented to the user C, and the rendering voice to be presented to the user D are each the spoken voice of the user A, but are different from each other. In other words, the rendering voices have the same voice reproduced, but are different in localization location of the sound image from each other. This is because the positional relations between the users B to D and the user A in the virtual communication space are different from each other.

<About Speculative Stereophonic Sound Rendering>

Next, the above-described features of the present technology will be described in more detail.

First, speculative stereophonic sound rendering will be described.

As described above, in the speculative stereophonic sound rendering, the stereophonic sound rendering processing (stereophonic sound processing) is performed for each of a plurality of orientations including the orientation of a listener.

Then, in the client 12, addition processing is performed at a ratio based on the VBAP or the like on the basis of a change in the orientation of the listener occurring in a period from the transmission of the orientation information for generation of the rendering voice to the reception of the rendering voice (delay time) to generate a presentation voice. As a result, it is possible to generate a voice with consideration given to the delay time in, for example, the transmission of the voice of the speaker occurring due to the intervention of the server 11.

Specifically, for example, in a case where the rendering voice of the other user to be presented to the user A who is a listener is generated, the server 11 receives the orientation information and the virtual location information of the user A from the client 12A.

Figure 6:
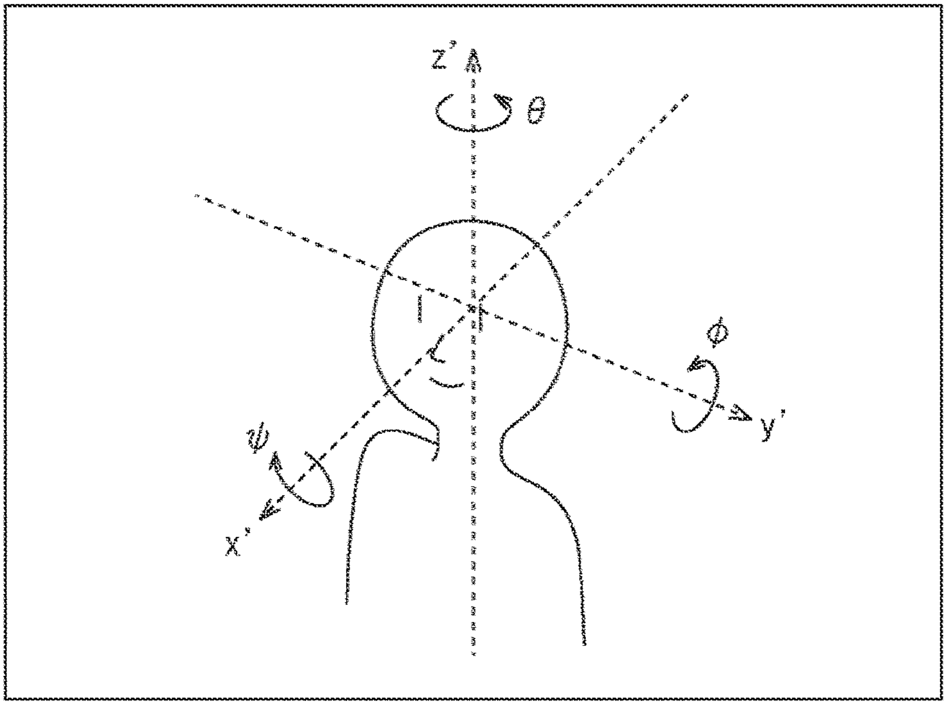
FIG. 6 is a diagram for describing orientation information.

As illustrated in FIG. 6, for example, the orientation information indicating the orientation (direction) of the user includes an angle θ, an angle φ, and an angle ψ indicating a rotation angle of the head of the user.

The angle $\theta$ is a rotation angle of the head of the user in the horizontal direction, that is, a yaw angle of the head of the user. For example, with a three-dimensional orthogonal coordinate system having the center of the head of the user as an origin point denoted as an x'y'z' coordinate system, a rotation angle of the head of the user with the z' axis as its center (axis) is the angle $\theta$.

The angle $\varphi$ is a rotation angle of the head of the user in the vertical direction with the y' axis as its center (axis), that is, a pitch angle of the head of the user. The angle $\psi$ is a rotation angle of the head of the user with the x' axis as its center (axis), that is, a roll angle of the head of the user.

Figure 7:
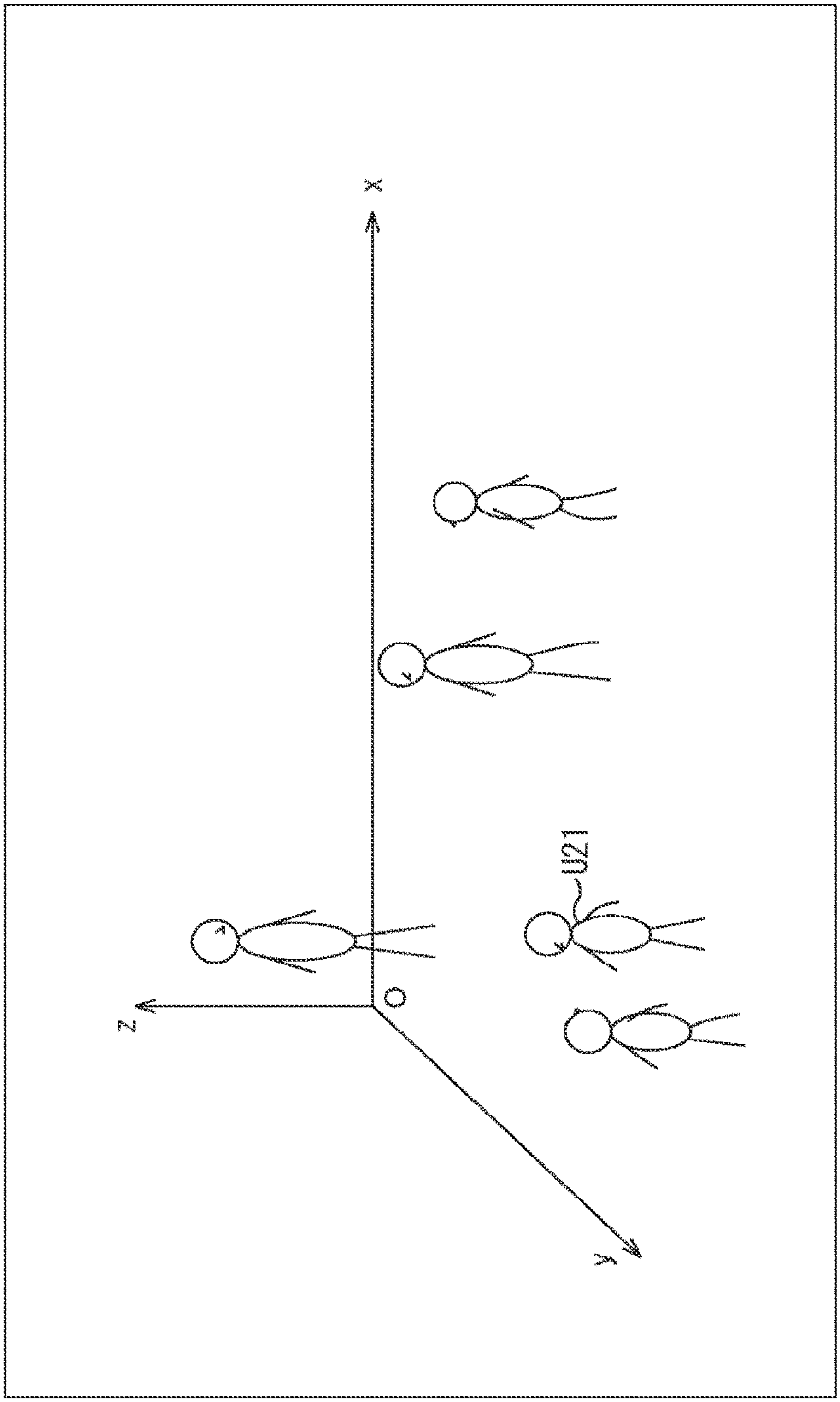
FIG. 7 is a diagram for describing a coordinate system in a virtual communication space.

Furthermore, for example, as illustrated in FIG. 7, when a three-dimensional orthogonal coordinate system with a predetermined location in the virtual communication space as an origin (origin point O) is denoted as an xyz coordinate system, the virtual location information indicating the location of the user in the virtual communication space is represented by coordinates (x, y, z) of the xyz coordinate system or the like.

In the example in FIG. 7, a plurality of users including a predetermined user U21 is arranged in the virtual communication space, and the rendering voices are generated such that the voices of the users are each localized basically at a location where the corresponding user himself/herself has spoken in the virtual communication space. Therefore, it can be said that the location indicated by the virtual location information of the user indicates a sound image localization location of the spoken voice of the user in the virtual communication space.

In the above-described example, the orientation information ($\theta$, $\varphi$, $\psi$) indicating the latest orientation of the user and the virtual location information (x, y, z) are transmitted to the server 11 at any desired timing.

Hereinafter, the orientation indicated by the orientation information ($\theta$, $\varphi$, $\psi$) is also referred to as orientation ($\theta$, $\varphi$, $\psi$), and the location indicated by the virtual location information (x, y, z) is also referred to as location (x, y, z).

Furthermore, the server 11 performs stereophonic sound rendering processing on the basis of the orientation information ($\theta$, $\varphi$, $\psi$) and virtual location information (x, y, z) of the user who is a listener and the virtual location information of the user who is a speaker to generate a rendering voice A ($\theta$, $\varphi$, $\psi$, x, y, z).

At this time, in a case where the listener is allowed to designate the location of the speaker, the virtual location information of the speaker received from the client 12 of the listener is used for generation of the rendering voice. On the other hand, in a case where the listener is not allowed to designate the location of the other user (speaker), and only the other user is allowed to designate his/her location, the virtual location information of the speaker himself/herself received from the client 12 of the speaker is used for generation of the rendering voice.

The rendering voice A ($\theta$, $\varphi$, $\psi$, x, y, z) is a voice of the speaker that is heard from the speaker in a state where the listener is facing the direction ($\theta$, $\varphi$, $\psi$) at the location (x, y, z), and the sound image of the voice of the speaker is localized at a relative location of the speaker as viewed from the listener.

As a specific example, for example, the information processing unit 43 reads, from the memory 42, the HRTF data corresponding to a relative positional relation between the listener and the speaker determined from the orientation information ($\theta$, $\varphi$, $\psi$) and virtual location information (x, y, z) of the listener and the virtual location information of the speaker.

The information processing unit 43 generates the rendering voice A ($\theta$, $\varphi$, $\psi$, x, y, z) by performing convolution of the read HRTF data and the voice data of the recorded voice of the speaker, that is, binaural processing.

Note that, at the time of generating the rendering voice A ($\theta$, $\varphi$, $\psi$, x, y, z), on the basis of a distance from the listener to the speaker obtained from the virtual location information of the listener and the virtual location information of the speaker, equalizing processing of adjusting frequency characteristics in accordance with the distance may be performed in combination with the binaural processing. As a result, distance attenuation or the like according to the relative positional relation between the listener and the speaker can also be realized, thereby allowing a more natural voice to be obtained.

Furthermore, the information processing unit 43 generates not only the rendering voice A ($\theta$, $\varphi$, $\psi$, x, y, z) for the orientation of the listener in the horizontal direction, that is, the angle $\theta$, but also a rendering voice for another angle (orientation) different from the angle $\theta$.

As an example, for example, the information processing unit 43 further performs stereophonic sound rendering processing including binaural processing or the like for an angle ($\theta+\Delta\theta$) and an angle ($\theta-\Delta\theta$) obtained by adding a positive/negative difference$\pm\Delta\theta$ in a certain direction to the angle $\theta$, and generates a rendering voice A ($\theta+\Delta\theta$, $\varphi$, $\psi$, x, y, z) and a rendering voice A ($\theta-\Delta\theta$, $\varphi$, $\psi$, x, y, z).

As a result, three sets of binaural voices, that is, the rendering voice A ($\theta$, $\varphi$, $\psi$, x, y, z), the rendering voice A ($\theta+\Delta\theta$, $\varphi$, $\psi$, x, y, z), and the rendering voice A ($\theta-\Delta\theta$, $\varphi$, $\psi$, x, y, z) that are stereo two-channel voices are obtained in advance.

As described above, the processing of generating a rendering voice for each of the plurality of orientations including the actual orientation (angle $\theta$) of the listener corresponds to speculative stereophonic sound rendering.

Note that, although the example where the rendering voices for three directions (orientations) are generated has been described above, any number of rendering voices may be generated as long as the number is greater than or equal to two.

For example, in a manner that depends on a condition that the network has a wide data transmission bandwidth to allow high-speed communication, that the server 11 or the client 12 has a high processing capacity to achieve a high throughput, or that the orientation of the user changes a lot, it is possible to increase the number of rendering voices to be generated.

In such a case, it is also possible to generate (1+2N) sets of rendering voices, such as a rendering voice A ($\theta$, $\varphi$, $\psi$, x, y, z), a rendering voice A ($\theta\pm\Delta\theta$, $\varphi$, $\psi$, x, y, z), a rendering voice A ($\theta\pm2\Delta\theta$, $\varphi$, $\psi$, x, y, z), . . . , a rendering voice A ($\theta\pm N\Delta\theta$, $\varphi$, $\psi$, x, y, z).

Hereinafter, the description will be continued on the assumption that three sets of rendering voices for one listener, that is, the rendering voice A ($\theta$, $\varphi$, $\psi$, x, y, z), the rendering voice A ($\theta+\Delta\theta$, $\varphi$, $\psi$, x, y, z), and the rendering voice A ($\theta-\Delta\theta$, $\varphi$, $\psi$, x, y, z) are generated for one speaker.

The server 11 transmits, to the client 12 that has transmitted the orientation information ($\theta$, $\varphi$, $\psi$) of the listener, the orientation information ($\theta$, $\varphi$, $\psi$), and the rendering voice A ($\theta$, $\varphi$, $\psi$, x, y, z), the rendering voice A ($\theta+\Delta\theta$, $\varphi$, $\psi$, x, y, z), and the rendering voice A ($\theta-\Delta\theta$, $\varphi$, $\psi$, x, y, z), which are voices after the stereophonic sound rendering processing (after the stereophonic sound processing).

Then, on the client 12 side, the orientation information and the rendering voices are received from the server 11, and the orientation information indicating the current orientation of the user (listener) is acquired.

Figure 8:
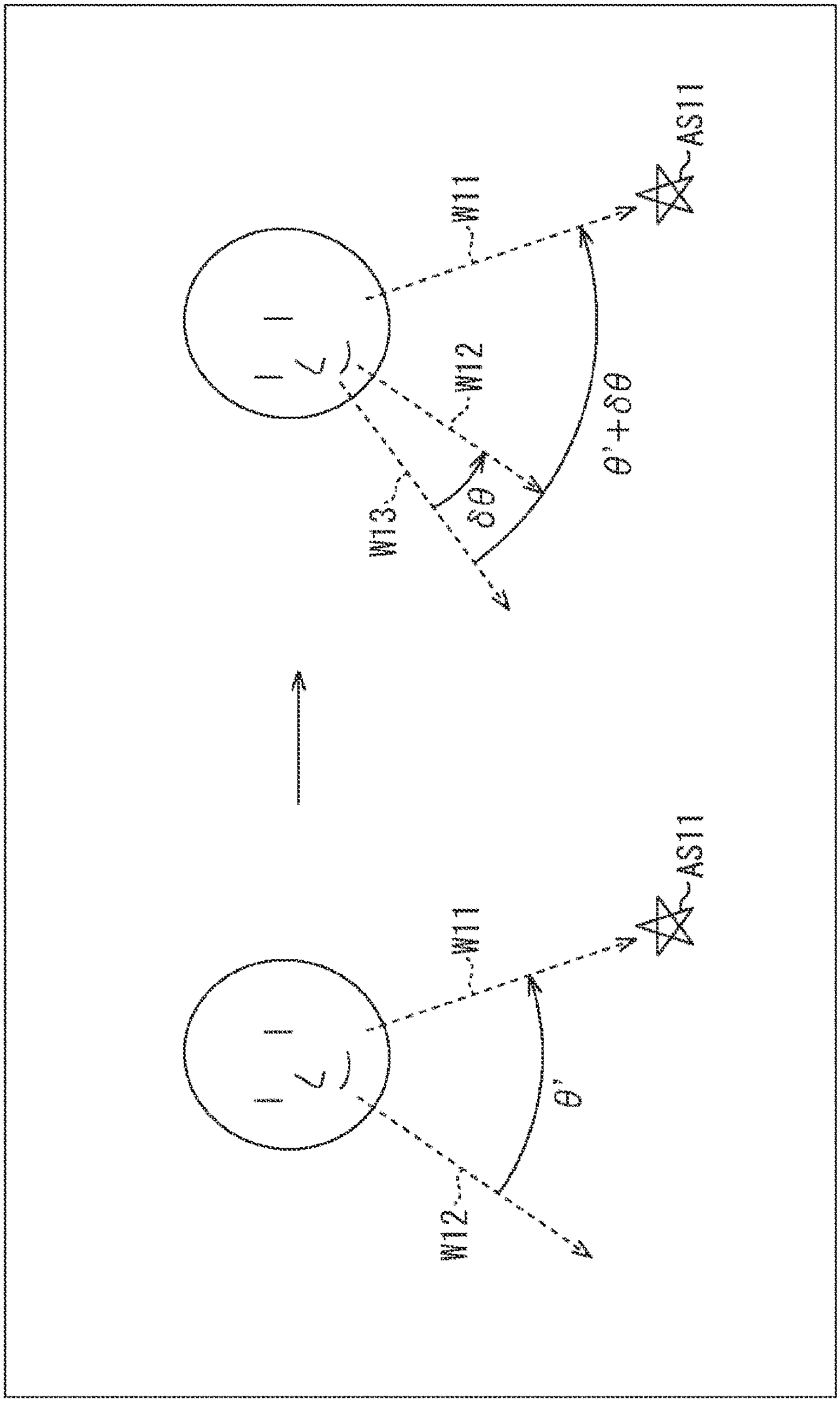
FIG. 8 is a diagram for describing a change in orientation of a listener.

For example, as illustrated in FIG. 8, it is assumed that a speaker is at a location AS11 in a direction indicated by an arrow W11 relative to the user who is a listener.

Furthermore, it is assumed that, at a predetermined time t, the user (listener) faces a direction indicated by an arrow W12, and an angle formed by the direction indicated by the arrow W 11 and the direction indicated by the arrow W12 is θ'. Moreover, it is assumed that an angle indicating the orientation of the user (listener) in the horizontal direction at the time t is the angle θ, and orientation information (θ, φ, ψ) indicating the orientation is transmitted to the server 11.

Then, it is assumed that, at a time t' after the time t, a rendering voice generated for the orientation information (θ, φ, ψ) of the listener at the time t and the orientation information (θ, φ, ψ) of the listener at the time t are received from the server 11.

Then, at the time t', the client 12 acquires the orientation information indicating the orientation of the listener at the time t'. In this example, it is assumed that the listener (user) faces a direction indicated by an arrow W13 at the time t' as illustrated on the right side of the drawing, for example.

Here, an angle formed by the direction indicated by the arrow W11 and the direction indicated by the arrow W13 is θ'+δθ, and it can be seen that the direction of the user (listener) changes by the angle δθ between the time t and the time t'. In this case, (θ+δθ, φ, ψ) is acquired as the orientation information of the listener at the time t'.

At the time t', the rendering voice corresponding to the orientation information (θ, φ, ψ) at the time t is received, but a rendering voice corresponding to the orientation information (θ+δθ, φ, ψ) at the time t' should be presented to the listener.

Therefore, the information processing unit 87 of the client 12 generates a presentation voice without delay for the time t' on the basis of at least one of the plurality of received rendering voices, and presents the generated presentation voice to the listener.

Specifically, the information processing unit 87 compares the orientation information (θ, φ, ψ) at the time of stereophonic sound rendering processing, that is, the time t with the orientation information (θ+δθ, φ, ψ) at the current time, that is, the time t', and selects two of the three rendering voices thus received on the basis of the comparison result.

In this example, as a result of comparison between the orientation information (θ, φ, ψ) at the time t and the orientation information (θ+δθ, φ, ψ) at the time t' of the same listener, a difference δθ in angle (angle θ) indicating the orientation of the listener in the horizontal direction at the times is obtained.

In a case where the difference δθ is positive, that is, in a case where 0<δθ≤Δθ, the information processing unit 87 selects two elements of the rendering voice A (θ, φ, ψ, x, y, z) and the rendering voice A (θ+Δθ, φ, ψ, x, y, z) from the received rendering voices.

On the other hand, in a case where the difference δθ is negative, that is, in a case where −Δθ≤δθ<0, the information processing unit 87 selects two elements of the rendering voice A (θ, φ, ψ, x, y, z) and the rendering voice A (θ−Δθ, φ, ψ, x, y, z) from the received rendering voices.

Reproducing the two elements selected at this time, that is, the two rendering voices allows a sound image to be localized at two sound image localization locations having an angle difference of the angle Δθ for one sound source (speaker).

Therefore, the information processing unit 87 generates a presentation voice such that the sound image is localized at a location in a direction in which the angle in the horizontal direction becomes the angle θ+δθ by calculating a weighted sum of the rendering voices localized at these two locations, that is, the selected two sets of stereophonic sound voices.

Figure 9:
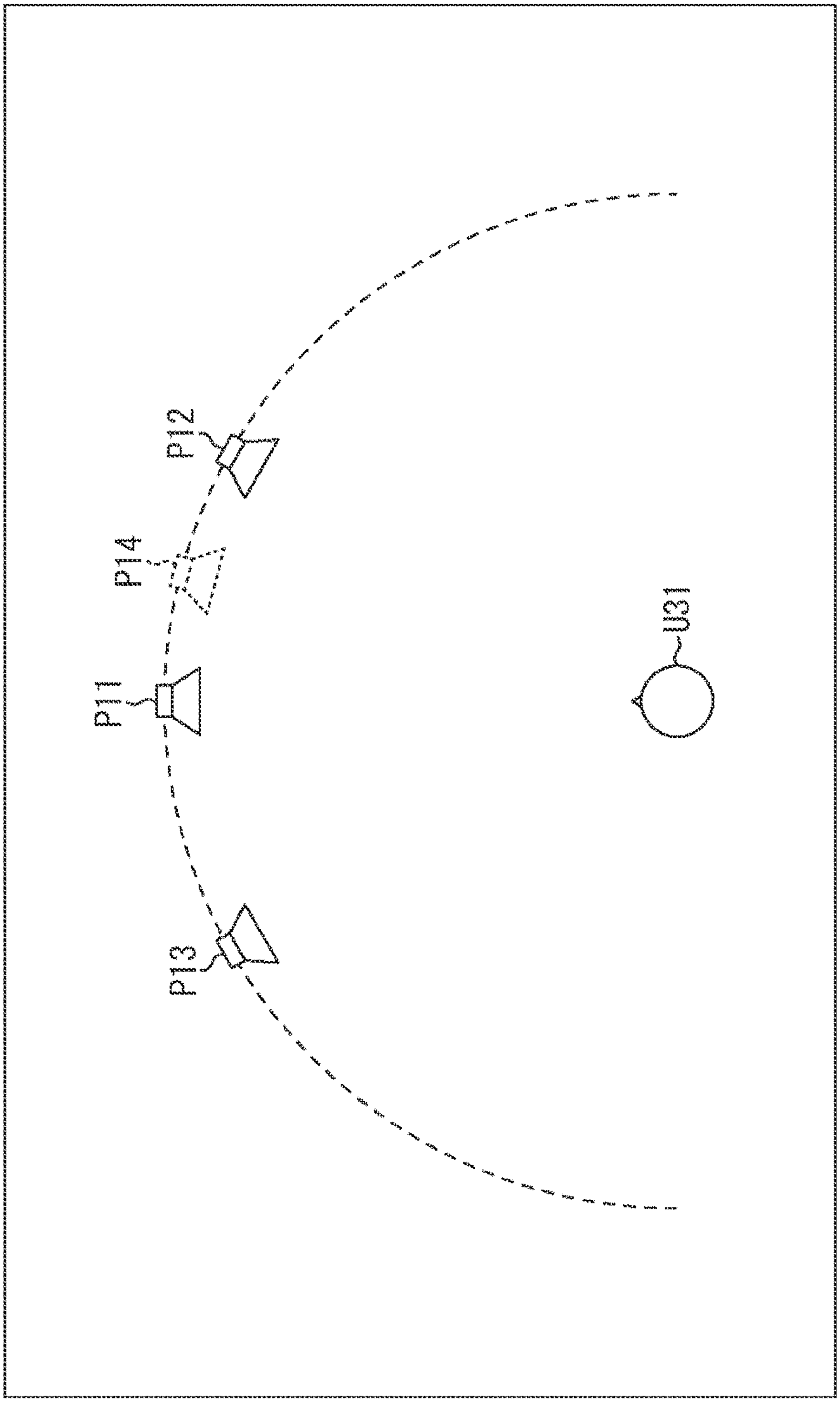
FIG. 9 is a diagram illustrating a relation between localization locations of a rendering voice and a presentation voice.
Figure 10:
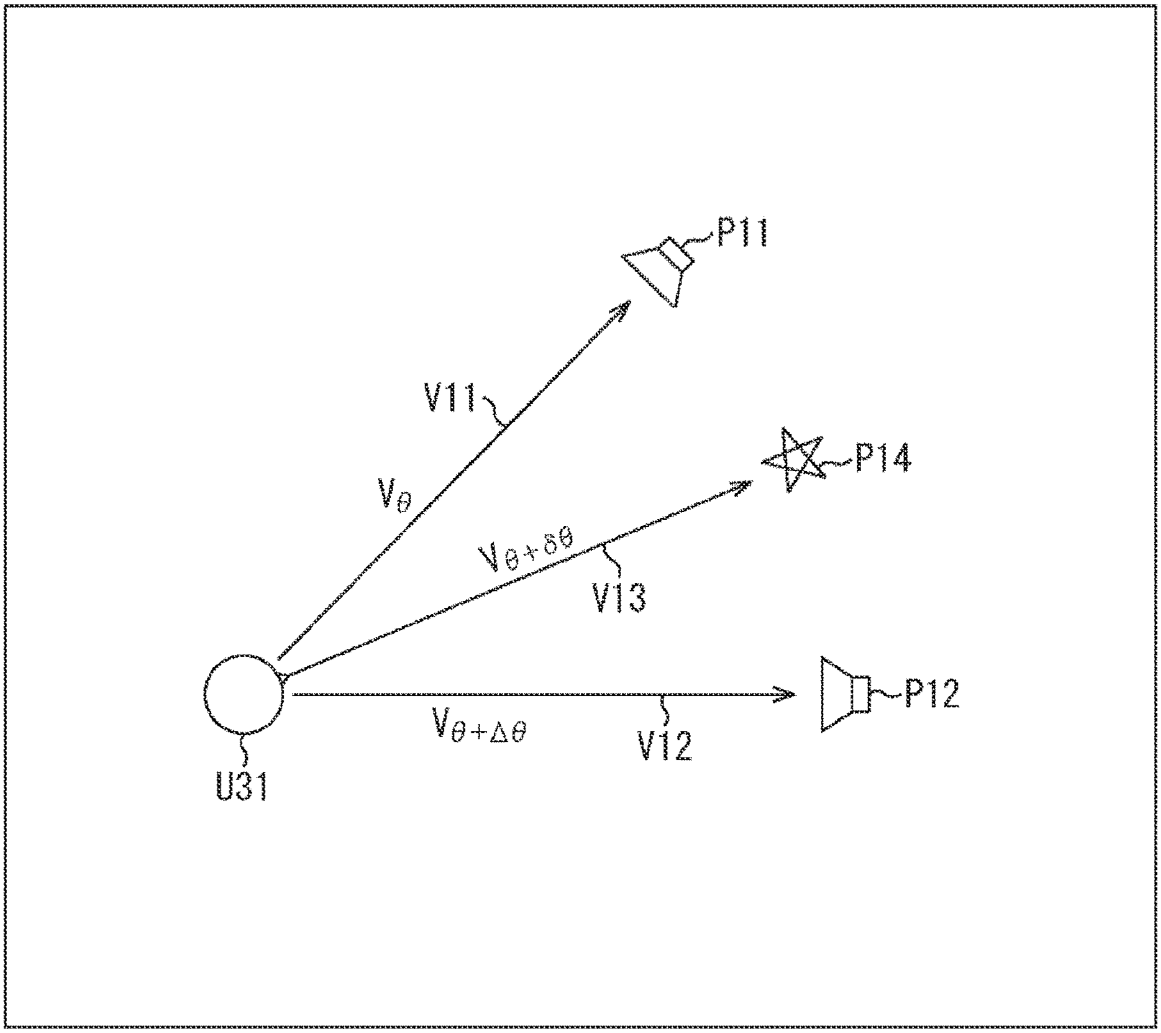
FIG. 10 is a diagram for describing how to generate the presentation voice.

At the time of addition of the two rendering voices, weights can be calculated by the VBAP, for example, as illustrated in FIGS. 9 and 10.

That is, as illustrated in FIG. 9, it is assumed that a rendering voice having its sound image localized at each of locations P11 to P13 is received from the server 11 for a user U31 who is a listener.

Here, for example, it is assumed that a voice localized at the location P11 is the rendering voice A (θ, φ, ψ, x, y, z), a voice localized at the location P12 is the rendering voice A (θ+Δθ, φ, ψ, x, y, z), and a voice localized at the location P13 is the rendering voice A (θ−Δθ, φ, ψ, x, y, z).

Furthermore, it is assumed that 0<δθ≤Δθ is satisfied, a presentation voice A (θ+Δθ, φ, ψ, x, y, z) corresponding to the orientation information (θ+Δθ, φ, ψ) is to be generated, and a sound image localization location of the presentation voice A (θ+Δθ, φ, ψ, x, y, z) is the location P14.

In such a case, the information processing unit 87 selects the rendering voice A (θ, φ, ψ, x, y, z) and the rendering voice A (θ+Δθ, φ, ψ, x, y, z) localized at the location P11 and the location P12 adjacent to both left and right sides of the location P14, respectively.

Furthermore, as illustrated in FIG. 10, vectors represented by arrows V11 to V13 with the location of the user U31 as an origin (starting point), and the location P11, the location P12, and the location P14 as endpoints are denoted as a vector $V_{\theta}$, a vector $V_{\theta+\Delta\theta}$, and a vector $V_{\theta+\delta\theta}$.

The information processing unit 87 calculates, as weights, a coefficient a and a coefficient b satisfying the following expression (1).

$$V_{\theta+\delta\theta} = aV_{\theta} + bV_{\theta+\Delta\theta} \tag{1}$$

Then, the information processing unit 87 calculates a weighted sum of the rendering voices with the following expression (2) using the coefficients a and b obtained by the expression (1) as weights to obtain the presentation voice A (θ+δθ, φ, ψ, x, y, z).

$$A(\theta+\delta\theta, \varphi, \psi, x, y, z) = aA(\theta, \varphi, \psi, x, y, z) + bA(\theta+\Delta\theta, \varphi, \psi, x, y, z) \tag{2}$$

By doing so, it is possible to obtain the presentation voice without delay for the current orientation of the listener, that is, the voice of the speaker localized at the current location of the speaker as viewed from the listener as the presentation voice. As a result, it is possible to realize a natural acoustic presentation without delay (difference in direction) and to make the speaker and the sound image coincident in location with each other, thereby allowing the voice of the speaker to be recognized more easily.

Note that, in a case where the angle δθ is zero degrees, and there is no change in the orientation of the listener in the horizontal direction, the information processing unit 87 outputs the rendering voice A (θ, φ, ψ, x, y, z) as it is to the voice output device 71 as the presentation voice, for example.

On the other hand, in a case where $|\delta\theta|$ exceeds $\Delta\theta$, the localization location of the presentation voice is outside the localization locations of the two selected rendering voices regardless of how the two rendering voices are selected. Therefore, the information processing unit 87 selects, from among the three rendering voices, a rendering voice whose localization location is closest to the localization location of the presentation voice.

Specifically, in a case where $\delta\theta<-\Delta\theta$ is satisfied, the information processing unit 87 uses the rendering voice A ($\theta-\Delta\theta$, $\varphi$, $\psi$, x, y, z) as it is as the presentation voice A ($\theta+\delta\theta$, $\varphi$, $\psi$, x, y, z).

On the other hand, in a case where $\delta\theta>\Delta\theta$ is satisfied, the information processing unit 87 uses the rendering voice A ($\theta+\Delta\theta$, $\varphi$, $\psi$, x, y, z) as it is as the presentation voice A ($\theta+\delta\theta$, $\varphi$, $\psi$, x, y, z).

Furthermore, the client 12 acquires the latest orientation information and virtual location information of the user and repeatedly transmits the orientation information and the virtual location information to the server 11 in parallel with the generation of the presentation voice by performing the above-described processing. By doing so, the orientation information and the virtual location information used for rendering on the server 11 side can be continuously updated to the latest information as soon as possible.

As a result, it is possible to keep a difference in the orientation of the listener, that is, the angle $\delta\theta$ small to make a difference from the location or orientation at the time of actual listening small for information other than the angle $\theta$, so that it is possible to realize, more in line with reality, stereophonic sound with less delay to changes in localization location.

Note that, although the example where the stereophonic sound rendering processing is performed on the server 11 side has been described above, the stereophonic sound rendering processing may be performed on the client 12 side of each user.

As a specific example, the configuration where the stereophonic sound rendering processing is performed on the client 12 side to generate a rendering voice is effective in the following cases.

That is, for example, there is a possible case where when movie contents reproduced on the terminal (client 12) of the user is watched, the above-described stereophonic sound rendering processing is performed on the sound of the movie contents in addition to the voice of the tele-communications on the client 12 side. In this case, it is possible to handle the content sound and the communications voice with a similar processing system.

For example, when processing that is high in computational complexity such as the stereophonic sound processing using HRTF data is performed, there is a case where a stereophonic sound processing system and a sound reproducing processing system are performed in different threads or processes. In such a case, a time difference occurs between a time point when the stereophonic sound processing is performed and a time point when the sound is actually reproduced, so that the orientation of the user changes during the time difference.

However, in the present technology, it is possible to perform the stereophonic sound rendering processing on the client 12 side as described above to compensate for a difference in the orientation of the user.

<About Selective Speaking and Selective Listening>

Next, selective speaking and selective listening will be described.

The selective listening as described above allows, when the listener faces the direction of a voice that the listener wants to listen to, the listener to clearly hear the voice.

Furthermore, in the selective listening, the voice of the speaker coming from a direction other than the front is made to sound like a muffled sound low in volume, in other words, a sound with a low sound pressure in the mid- to high-frequency range, or a hollow sound, that is, a sound with a low sound pressure in the mid- to low-frequency range as the location of the speaker becomes closer to right behind the listener.

Similarly, in the selective speaking, radiation characteristics of the spoken voice of the speaker are reproduced, and when the speaker faces the listener, the listener can clearly hear the voice of the speaker.

Furthermore, in the selective speaking, as the speaker deviates from the direction of the listener, the voice of the speaker is made to sound like a muffled sound low in volume (a sound with a low sound pressure in the mid- to high-frequency range) or a hollow sound (a sound with a low sound pressure in the mid- to low-frequency range).

Figure 11:
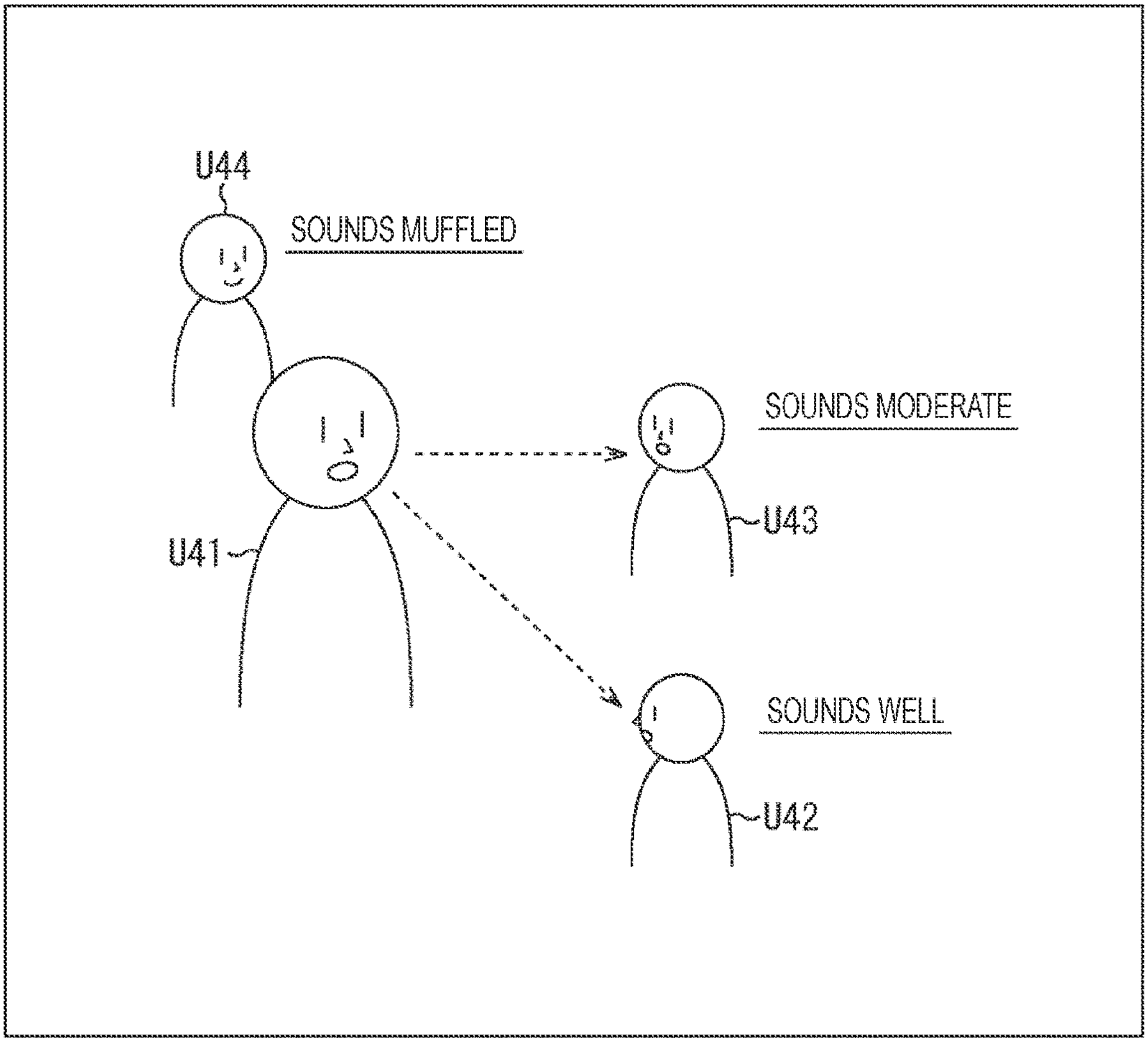
FIG. 11 is a diagram for describing selective speaking and selective listening.

For example, as illustrated in FIG. 11, consider a case where there are four users U41 to U44 in the virtual communication space, and the user U41 is a speaker.

At this time, if the selective speaking or the selective listening is applied, the spoken voice of the user U41 who is a speaker is clearly heard by the user U42 who is in the front direction of the user U41.

Furthermore, the spoken voice of the user U41 is heard by the user U43 located on the left side as viewed from the user U41 as a moderately clear sound but not as clear as the voice heard by the user U42. Moreover, the voice of the user U41 is heard like a muffled sound by the user U44 located behind the user U41 as viewed from the user U41.

For example, the selective listening and the selective speaking are realized by the information processing unit 43 of the server 11 as follows.

That is, first, in the information processing unit 43, the orientation information and virtual location information of each user who is a participant in the tele-communications are acquired, and the orientation information and the virtual location information are aggregated and updated in real-time.

Then, the information processing unit 43 obtains an angle difference $\theta_D$ indicating the direction of the speaker as viewed from the listener on the basis of each listening point, that is, the location and orientation of each user who is a listener in the virtual communication space and the location of the other user who is a speaker in the virtual communication space.

Specifically, for example, the information processing unit 43 obtains the direction of the speaker as viewed from the listener on the basis of the virtual location information of the listener and the virtual location information of the speaker, and sets an angle between the obtained direction and the direction indicated by the orientation information of the listener (front direction of the listener) as the angle difference $\theta_D$.

Furthermore, for the information processing unit 43, there is a case where the listener desires to listen to a voice in a wide range, or a case where the listener desires to listen to a voice in a narrow range, depending on the state of the listener, so that a function $f(\theta_D)$ having the angle difference $\theta_D$ as a parameter is designed in advance as a function indicating directivity $I_D$ of a sound to listen to.

Here, $I_D=f(\theta_D)$, and the function $f(\theta_D)$ may be predetermined, or may be designated (selected) by the listener (user)

or the information processing unit 43 from among a plurality of functions. In other words, the listener or the information processing unit 43 may be allowed to designate the directivity $I_D$ (directivity characteristics).

Figure 12:
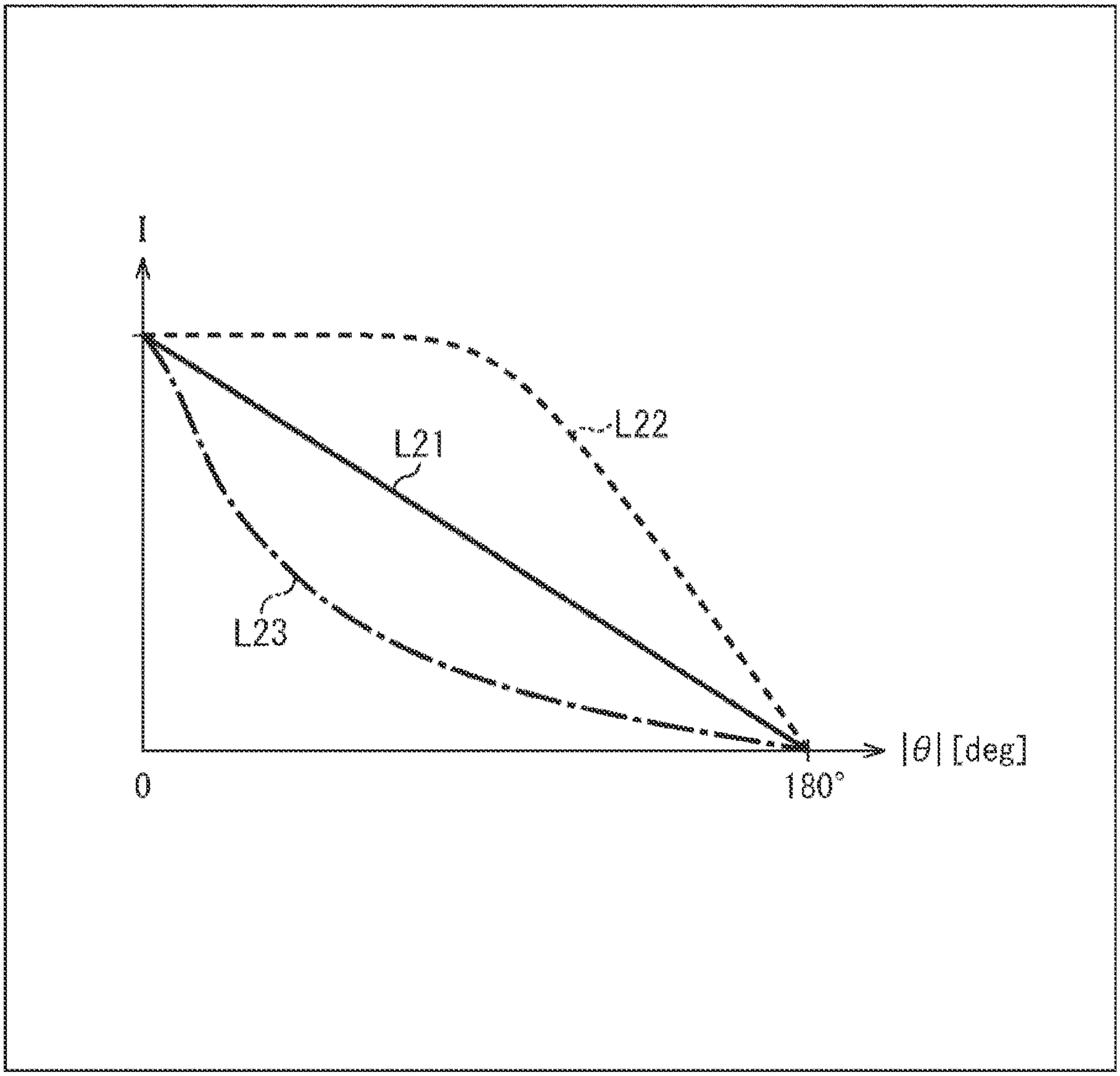
FIG. 12 is a diagram for describing a difference in face orientation and voice directivity.

For example, the directivity $I_D$ can be designed to change as illustrated in FIG. 12 in accordance with the angle difference $\theta_D$. Note that, in FIG. 12, the vertical axis represents the directivity $I_D$ (directivity characteristics), and the horizontal axis represents the angle difference, that is, the angle difference $\theta_D$.

In this example, curves L21 to L23 each indicate directivity $I_D$ obtained by a different function $f(\theta_D)$.

In particular, the curve L21 indicates that the directivity $I_D$ decreases linearly in response to a change in the angle difference $\theta_D$, and the curve L21 represents standard directivity.

On the other hand, the curve L22 indicates that the directivity $I_D$ gradually decreases in response to an increase in the angle difference $\theta_D$, and the curve L22 represents directivity suitable for a wider listening range. Furthermore, the curve L23 indicates that the directivity $I_D$ sharply decreases in response to an increase in the angle difference $\theta_D$, and the curve L23 represents directivity suitable for a narrower listening range.

It is therefore possible for the listener or the information processing unit 43 to select suitable directivity $I_D$ (function $f(\theta_D)$) in accordance with, for example, the number of participants, the environment of the virtual communication space such as acoustic characteristics, or the like.

Moreover, the information processing unit 43 obtains the directivity $I_D$ on the basis of the angle difference $\theta_D$ and the function $f(\theta_D)$, and generates a filter $A_D=F_D(I_D)$ for equalizing control of the voice of the speaker, that is, sound pressure control for each frequency band on the basis of the obtained directivity $I_D$. Note that the $F_D(I_D)$ is a function or the like using the directivity $I_D$ as a parameter.

The selective listening is realized by the filter $A_D$ obtained as described above.

That is, it is possible to generate, by filtering with the filter $A_D$, a rendering voice such that the voice of the speaker is clearly heard as the direction of the speaker as viewed from the listener becomes closer to the front direction of the listener. In this case, for example, the wider the angle (angle difference $\theta_D$) formed by the direction of the speaker as viewed from the listener and the front direction of the listener, the lower the sound pressure of the rendering voice of the speaker in the mid- to high-frequency range or the mid- and low-frequency range.

Furthermore, the information processing unit 43 obtains the direction of the listener as viewed from the speaker on the basis of the virtual location information of the speaker and the virtual location information of the listener, and sets an angle formed by the obtained direction and the direction indicated by the orientation information of the speaker (front direction of the speaker) as an angle difference $\theta_E$.

Similarly to the selective speaking, there is a case where it is desired to make a speaking range wide, that is, it is desired to speak to a wide range, or a case where it is desired to speak to a narrow range, depending on the state of the speaker. Therefore, for the information processing unit 43, a function $f(\theta_E)$ having the angle difference $\theta_E$ as a parameter is designed in advance as a function indicating directivity $I_E$ of a spoken voice.

Here, $I_E=f(\theta_E)$, and the function $f(\theta_E)$ may be predetermined, or may be designated (selected) by the speaker (user) or the information processing unit 43 from among a plurality of functions. In other words, the speaker or the information processing unit 43 may be allowed to designate the directivity $I_E$ (directivity characteristics).

For example, the directivity $I_E$ can be designed to change, in a manner similar to the directivity $I_D$ illustrated in FIG. 12, in accordance with the angle difference $\theta_E$.

In such a case, the vertical axis in FIG. 12 represents the directivity $I_E$, and the horizontal axis represents the angle difference $\theta_E$, and for example, in a case where it is desired to make the speaking range narrow, it is only required that the directivity $I_E$ having characteristics (radiation characteristics) represented by the curve L23 be selected.

As described above, the speaker or the information processing unit 43 can select suitable directivity $I_E$ (function $f(\theta_E)$) in accordance with, for example, the number of participants, the speaking content, the environment of the virtual communication space such as acoustic characteristics, or the like.

Moreover, the information processing unit 43 obtains the directivity $I_E$ on the basis of the angle difference $\theta_E$ and the function $f(\theta_E)$, and generates a filter $A_E=F_E(I_E)$ for equalizing control of the voice of the speaker, that is, sound pressure control for each frequency band on the basis of the obtained directivity $I_E$. Note that $F_E(I_E)$ is a function or the like using the directivity $I_E$ as a parameter.

The selective speaking is realized by the filter $A_E$ obtained as described above.

That is, it is possible to generate, by filtering with the filter $A_E$, a rendering voice such that the voice of the speaker is clearly heard as the front direction of the speaker becomes closer to the direction of the listener as viewed from the speaker (the angle difference $\theta_E$ becomes smaller). In this case, for example, the wider the angle (angle difference $\theta_E$) formed by the direction of the listener as viewed from the speaker and the front direction of the speaker, the lower the sound pressure of the rendering voice of the speaker in the mid- to high-frequency range or the mid- to low-frequency range.

A combination of the filter $A_D$ and the filter $A_E$ allows the information processing unit 43 to easily control a degree of changes in sound pressure for the angle difference $\theta_D$ or the angle difference $\theta_E$ and each frequency band in accordance with a desired speaking or listening range.

Figure 13:
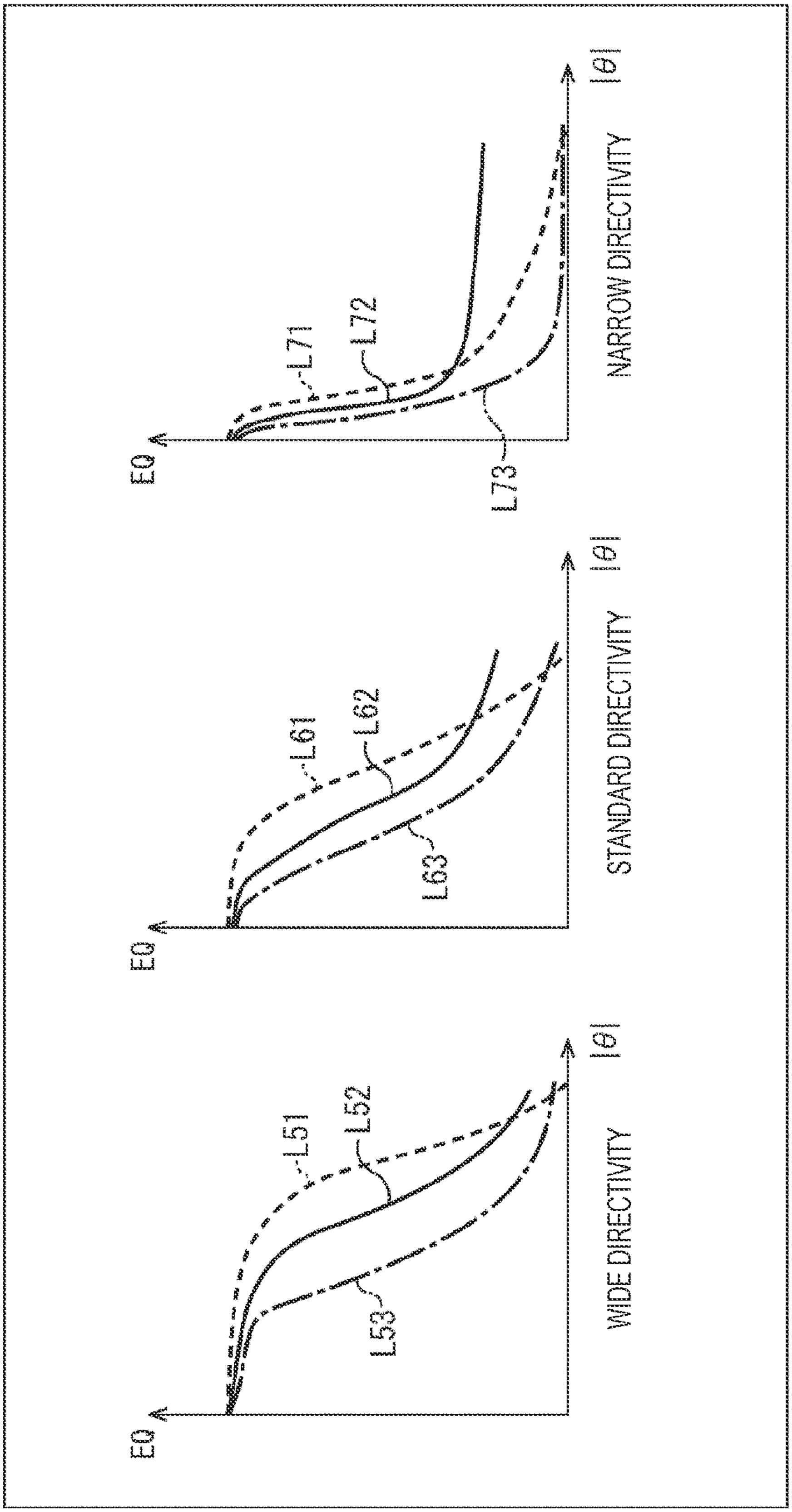
FIG. 13 is a diagram for describing a difference in face orientation and a change in sound pressure for each frequency band.

That is, it is possible to adjust, by using the filter $A_D$ or the filter $A_E$, frequency characteristics (sound pressure for each frequency band) of the rendering voice on the basis of the characteristics illustrated in FIG. 13, for example.

Note that, in FIG. 13, the vertical axis represents an EQ value (amplification value) when filtering is performed using the filter $A_D$ or the filter $A_E$, and the horizontal axis represents an angle difference, that is, the angle difference $\theta_D$ or the angle difference $\theta_E$.

In this example, the left side of the drawing shows an EQ value for each frequency band in a case where a wide range is desired, that is, in a case where wide directivity $I_D$ or directivity $I_E$ corresponding to the curve L22 in FIG. 12 is used. Specifically, a curve L51 indicates an EQ value for each angle difference in a high-frequency range, that is, a high range, a curve L52 indicates an EQ value for each angle difference in a mid-frequency range (midrange), and a curve L53 indicates an EQ value for each angle difference in a low-frequency range (low range).

Similarly, the center of the drawing shows an EQ value for each frequency band in a case where a standard range is desired, that is, in a case where standard directivity $I_D$ or directivity $I_E$ corresponding to the curve L21 in FIG. 12 is used. Specifically, a curve L61 indicates an EQ value for each angle difference in a high-frequency range (high range), a curve L62 indicates an EQ value for each angle difference in a mid-frequency range (midrange), and a curve L63 indicates an EQ value for each angle difference in a low-frequency range (low range).

In this example, the right side of the drawing shows an EQ value for each frequency band in a case where a narrow range is desired, that is, in a case where narrow directivity $I_D$ or directivity $I_E$ corresponding to the curve L23 in FIG. 12 is used. Specifically, a curve L71 indicates an EQ value for each angle difference in a high-frequency range (high range), a curve L72 indicates an EQ value for each angle difference in a mid-frequency range (midrange), and a curve L73 indicates an EQ value for each angle difference in a low-frequency range (low range).

The use of the combination of the filter $A_D$ and the filter $A_E$ as described above allows the sound pressure control to be performed, for each frequency band, for a desired listening range or a desired speaking range.

For example, it is possible for the information processing unit 43 to perform, after performing sound pressure adjustment processing or echo cancellation processing on the voice of the speaker as preprocessing, filtering using the filter $A_D$ and the filter $A_E$, and then perform the above-described stereophonic sound rendering processing.

As a result, it is possible for the user to speak to a target person in an easy-to-understand manner or listen to a target voice in an easy-to-understand manner while having intended directivity.

<Configuration Example of Information Processing Unit>

Figure 14:
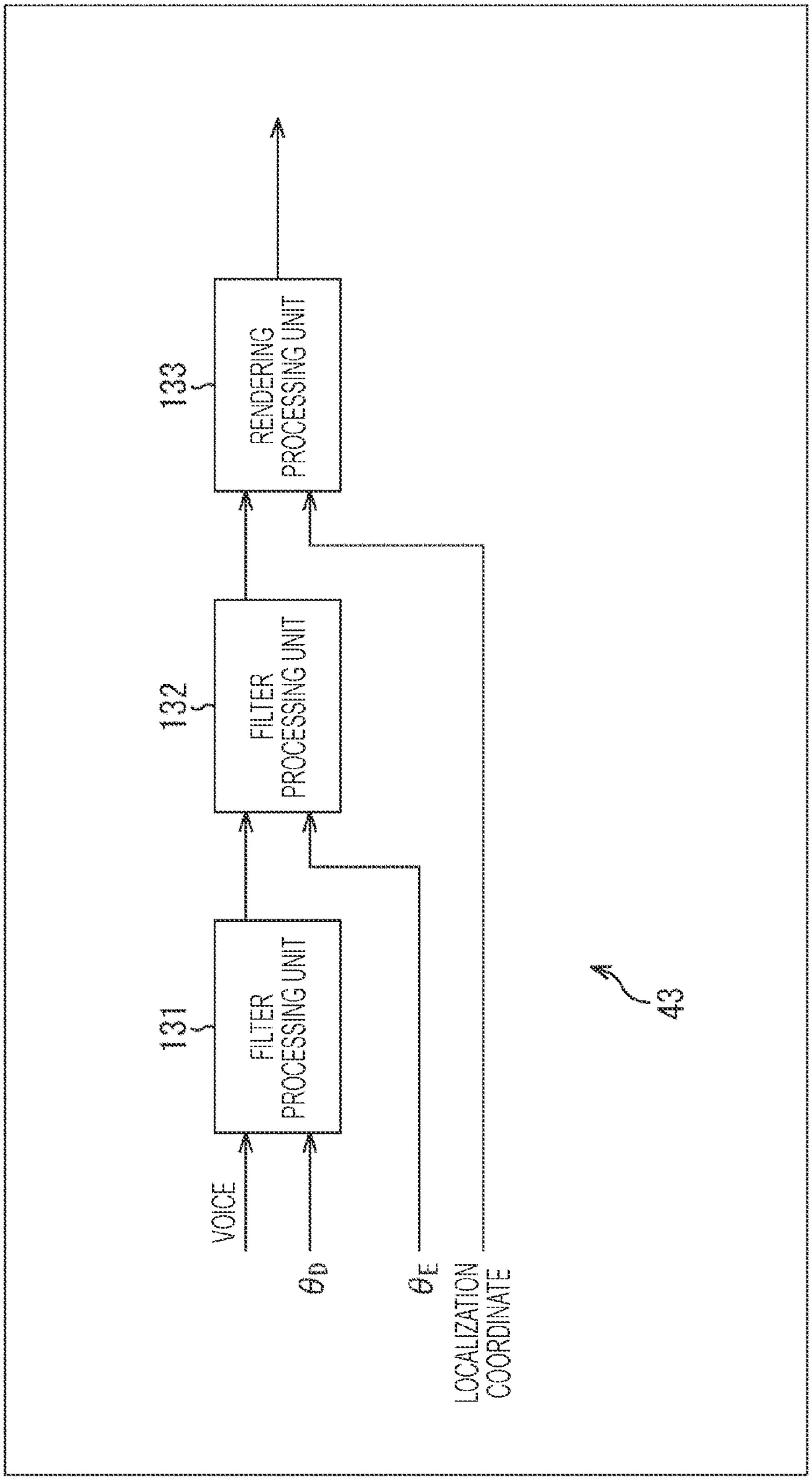
FIG. 14 is a diagram illustrating a configuration example of an information processing unit.

In a case where the rendering voice is generated by performing processing on the spoken voice (recorded voice) in the order of the preprocessing, the filtering for the selective listening and the selective speaking, and the stereophonic sound rendering processing, the information processing unit 43 is configured as illustrated in FIG. 14, for example.

The information processing unit 43 illustrated in FIG. 14 includes a filter processing unit 131, a filter processing unit 132, and a rendering processing unit 133.

In this example, the information processing unit 43 performs the preprocessing such as sound pressure adjustment processing or echo cancellation processing on the voice (recorded voice) of the speaker supplied from the communication unit 41, and supplies the voice (voice data) obtained as a result of the preprocessing to the filter processing unit 131.

Furthermore, the information processing unit 43 obtains the angle difference $\theta_D$ and the angle difference $\theta_E$ on the basis of the orientation information and virtual location information of each user, supplies the angle difference $\theta_D$ to the filter processing unit 131, and supplies the angle difference $\theta_E$ to the filter processing unit 132.

Moreover, the information processing unit 43 obtains information indicating a relative location of the speaker as viewed from the listener as localization coordinates indicating a location at which the voice of the speaker is localized on the basis of the orientation information and virtual location information of each user, and supplies the information to the rendering processing unit 133.

The filter processing unit 131 generates the filter $A_D$ on the basis of the supplied angle difference $\theta_D$ and the designated function $f(\theta_D)$. Furthermore, the filter processing unit 131 performs filtering on the supplied recorded voice that has been subjected to the preprocessing on the basis of the filter $A_D$, and supplies the voice obtained as a result of the filtering to the filter processing unit 132.

The filter processing unit 132 generates the filter $A_E$ on the basis of the supplied angle difference $\theta_E$ and the designated function $f(\theta_E)$. Furthermore, the filter processing unit 132 performs filtering on the voice supplied from the filter processing unit 131 on the basis of the filter $A_E$, and supplies the voice obtained as a result to the filtering to the rendering processing unit 133.

The rendering processing unit 133 reads the HRTF data corresponding to the supplied localization coordinates from the memory 42, and performs binaural processing on the basis of the HRTF data and the voice supplied from the filter processing unit 132 to generate a rendering voice. Furthermore, the rendering processing unit 133 further performs filtering or the like for adjusting frequency characteristics on the rendering voice thus obtained in accordance with a distance from the listener to the speaker, that is, the localization coordinates.

The rendering processing unit 133 performs binaural processing or the like for each of a plurality of orientations (directions) of the listener, for example, for the angle $\theta$, the angle $(\theta+\Delta\theta)$, and the angle $(\theta-\Delta\theta)$, to obtain a rendering voice for each angle (direction).

In the information processing unit 43, the processing by the filter processing unit 131, the processing by the filter processing unit 132, and the processing by the rendering processing unit 133 described above are performed for each combination of the user who is a listener and the user who is a speaker.

<Description of Voice Transmission Processing>

Next, how the server 11 and the client 12 described above operate will be described.

First, the voice transmission processing performed by the client 12 will be described with reference to the flowchart in FIG. 15. This voice transmission processing is performed, for example, at regular time intervals.

In step S11, the information processing unit 87 sets the location of the user in the virtual communication space. Note that, in a case where the user is not allowed to designate his/her location, the process of step S11 is skipped.

For example, in a case where the user is allowed to set (designate) at least his/her location, the user operates the input unit 86 at any desired timing to designate his/her location in the virtual communication space. Then, the information processing unit 87 sets the location of the user by generating virtual location information indicating the location designated by the user in accordance with a signal supplied from the input unit 86 in response to the operation performed by the user.

The location of the user himself/herself may be freely changed at a timing desired by the user, or once the location of the user is designated, the location of the user may be continuously set to the same position.

Furthermore, in a case where the user is also allowed to designate the location of the other user in the virtual communication space, the information processing unit 87 also generates virtual location information of the other user in response to the operation performed by the user.

In step S12, the sound collection unit 82 collects a surrounding sound and supplies a recorded voice (voice data of the recorded voice) obtained as a result of the sound collection to the information processing unit 87.

In step S13, the orientation sensor 81 detects the orientation of the user, and supplies orientation information indicating the detection result to the information processing unit 87.

The information processing unit 87 supplies the recorded voice, the orientation information, and the virtual location information obtained by the above processing to the communication unit 84. At this time, in a case where there is virtual location information of the other user, the information processing unit 87 also supplies the virtual location information of the other user to the communication unit 84.

In step S14, the communication unit 84 transmits the recorded voice, the orientation information, and the virtual location information supplied from the information processing unit 87 to the server 11, and then the voice transmission processing is brought to an end.

Note that, in a case where the user is allowed to designate (select) directivity for listening or speaking, that is, the above-described function $f(\theta_D)$ or the number of functions $f(\theta_E)$, directivity designated by the user may be received in step S11, for example. In such a case, the information processing unit 87 generates directivity designation information in accordance with the designation made by the user, and the communication unit 84 transmits the directivity designation information to the server 11 in step S14.

As described above, the client 12 transmits, to the server 11, the orientation information and the virtual location information together with the recorded voice. By doing so, it is possible for the server 11 to appropriately generate the rendering voice, so that the voice of the speaker can be easily recognized.

<Description of Voice Generation Processing>

Furthermore, when the voice transmission processing is performed, the server 11 performs voice generation processing accordingly. Next, the voice generation processing performed by the server 11 will be described with reference to the flowchart in FIG. 16.

In step S41, the communication unit 41 receives the recorded voice, the orientation information, and the virtual location information transmitted from each client 12, and supplies the recorded voice, the orientation information, and the virtual location information to the information processing unit 43.

Then, the information processing unit 43 performs preprocessing such as sound pressure adjustment processing or echo cancellation processing on the recorded voice of the speaker supplied from the communication unit 41, and supplies a voice obtained as a result of the preprocessing to the filter processing unit 131.

Furthermore, the information processing unit 43 obtains the angle difference $\theta_D$ and the angle difference $\theta_E$ on the basis of the orientation information and virtual location information of each user supplied from the communication unit 41, supplies the angle difference $\theta_D$ to the filter processing unit 131, and supplies the angle difference $\theta_E$ to the filter processing unit 132. Moreover, the information processing unit 43 obtains localization coordinates indicating a relative location of the speaker as viewed from the listener on the basis of the orientation information and virtual location information of each user, and supplies the localization coordinates to the rendering processing unit 133.

In step S42, the filter processing unit 131 performs filtering for selective listening on the basis of the supplied angle difference $\theta_D$ and voice.

That is, the filter processing unit 131 generates the filter $A_D$ on the basis of the angle difference $\theta_D$ and the function $f(\theta_D)$, performs filtering on the supplied recorded voice that has been subjected to the preprocessing on the basis of the filter $A_D$, and supplies a voice obtained as a result of the filtering to the filter processing unit 132.

Note that, in a case where the directivity designation information described above is received in step S41, the filter processing unit 131 generates the filter $A_D$ using the function $f(\theta_D)$ indicated by the directivity designation information of the user who is a listener.

In step S43, the filter processing unit 132 performs filtering for selective speaking on the basis of the supplied angle difference $\theta_E$ and voice.

That is, the filter processing unit 132 generates the filter $A_E$ on the basis of the angle difference $\theta_E$ and the function $f(\theta_E)$, performs filtering on the voice supplied from the filter processing unit 131 on the basis of the filter $A_E$, and supplies a voice obtained as a result of the filtering to the rendering processing unit 133.

Note that, in a case where the directivity designation information described above is received in step S41, the filter processing unit 132 generates the filter $A_E$ using the function $f(\theta_E)$ indicated by the directivity designation information of the user who is a speaker.

In step S44, the rendering processing unit 133 performs stereophonic sound rendering processing on the basis of the supplied localization coordinates and the voice supplied from the filter processing unit 132.

That is, the rendering processing unit 133 performs binaural processing on the basis of the HRTF data read from the memory 42 on the basis of the localization coordinates and the voice of the speaker, and performs filtering or the like for adjusting frequency characteristics in accordance with the localization coordinates to generate a rendering voice. In other words, the rendering processing unit 133 generates the rendering voice by performing acoustic processing including binaural processing and filtering processing for a plurality of directions.

As a result, a rendering voice $A(\theta, \varphi, \psi, x, y, z)$, a rendering voice $A(\theta+\Delta\theta, \varphi, \psi, x, y, z)$, and a rendering voice $A(\theta-\Delta\theta, \varphi, \psi, x, y, z)$ that are stereo two-channel voices are obtained, for example.

The information processing unit 43 performs the processes of steps S42 to S44 described above for each combination of the user who is a listener and the user who is a speaker.

Therefore, for example, in a case where there is a plurality of speakers who simultaneously speaks to a certain listener, the above-described processing is performed for each speaker to generate a rendering voice. Then, the information processing unit 43 adds a rendering voice for the same direction (angle $\theta$) for each of the plurality of speakers generated for the same listener to obtain a final rendering voice.

The information processing unit 43 supplies, to the communication unit 41, the rendering voice generated for each user, more specifically, voice data of the rendering voice, and the orientation information of the user who is a listener used for generation of the rendering voice.

In step S45, the communication unit 41 transmits the rendering voice and the orientation information supplied from the information processing unit 43 to the client 12, and then the voice generation processing is brought to an end.

Note that, for example, in a case where the user is not allowed to designate the virtual location information of the other user, the communication unit 41 transmits the virtual location information of the other user designated by the other user to the client 12 of the user as necessary in step S45. As a result, each client 12 can obtain the virtual location information of all the users participating in the tele-communications.

As described above, the server 11 performs the stereophonic sound rendering processing to generate the rendering voice of the speaker localized at a location in accordance with the positional relation between the listener and the speaker, that is, the orientation and location of the listener and the location of the speaker.

By doing so, the voice of the speaker can be easily recognized. In addition, performing filtering for realizing selective speaking or selective listening allows the voice of the speaker to be recognized more easily. Furthermore, generating the rendering voice for a plurality of orientations of the listener makes it possible to realize a more natural acoustic presentation without causing the client 12 to feel a delay.

<Description of Reproduction Processing>

Moreover, when the server 11 performs the voice generation processing and transmits the rendering voice to each client 12, the client 12 performs reproduction processing of reproducing a presentation voice. Hereinafter, the reproduction processing performed by the client 12 will be described with reference to a flowchart in FIG. 17.

In step S71, the communication unit 84 receives the rendering voice and the orientation information transmitted from the server 11, and supplies the rendering voice and the orientation information to the information processing unit 87. Note that, in a case where the virtual location information of the other user is also transmitted from the server 11, the communication unit 84 further receives the virtual location information of the other user and supplies the virtual location information to the information processing unit 87.

In step S72, the information processing unit 87 performs the processing described with reference to FIGS. 9 and 10 on the basis of the rendering voice and the orientation information supplied from the communication unit 84 to generate a presentation voice, more specifically, voice data of the presentation voice.

For example, the information processing unit 87 obtains the above-described difference δθ on the basis of orientation information indicating the current orientation of the user newly acquired from the orientation sensor 81 and the orientation information received in step S71. Then, the information processing unit 87 selects one or two rendering voices from the three rendering voices received in step S71 on the basis of the difference δθ.

Furthermore, in a case where one of the rendering voices is selected, the information processing unit 87 sets the selected rendering voice as the presentation voice as it is.

On the other hand, in a case where two of the rendering voices are selected, the information processing unit 87 performs calculation similar to the above-described expression (1) on the basis of a sound image localization location obtained from the orientation, location, or the like of the user who is a listener to obtain a coefficient a and a coefficient b corresponding to the selected rendering voices.

Figure 15:
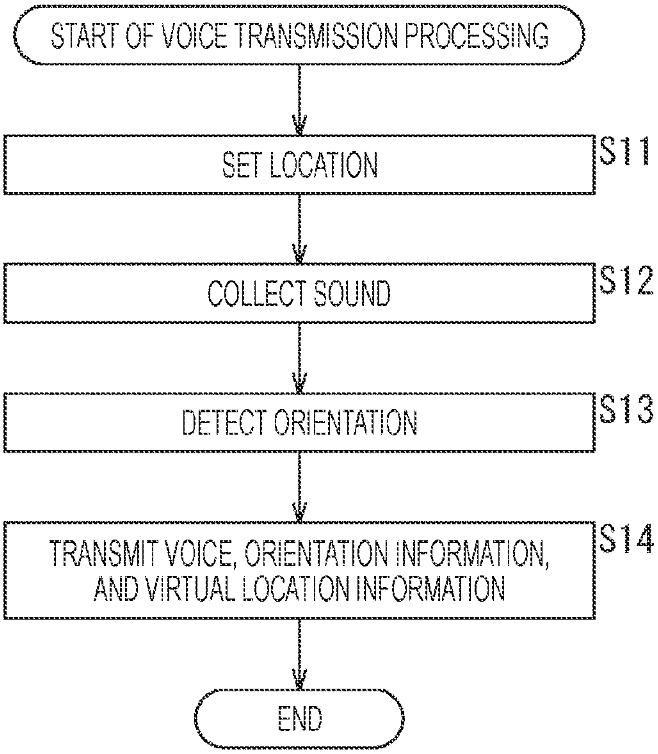
FIG. 15 is a flowchart for describing voice transmission processing.

At this time, the virtual location information of the other user designated by the user in step S11 in FIG. 15 or received from the server 11 in step S71, the virtual location information of the user, the current orientation information of the user, or the like may be used as necessary.

Moreover, the information processing unit 87 adds up (synthesizes) the two selected rendering voices by performing calculation similar to the above-described expression (2) on the basis of the obtained coefficients a and b to generate a presentation voice.

Furthermore, the information processing unit 87 generates a virtual communication space image in which the user, the other user, and the like appear on the basis of the virtual location information of the user himself/herself or the other user, the orientation information of the user himself/herself or the other user, and the like set in step S11 in FIG. 15.

Note that, for example, in a case where the user is not allowed to designate the location of the other user, the virtual location information of the other user received from the server 11 in step S71 is used for generation of the virtual communication space image. Furthermore, the orientation information of the other user may be received from the server 11 as necessary.

In step S73, the information processing unit 87 outputs the presentation voice generated by the process of step S72 to the voice output device 71 to cause the voice output device 71 to reproduce the presentation voice. As a result, telecommunications between the user and the other user are realized.

In step S74, the information processing unit 87 supplies the virtual communication space image generated by the process of step S72 to the display unit 85 to cause the display unit 85 to display the virtual communication space.

After the virtual communication space image and the presentation voice are presented to the user, the reproduction processing is brought to an end. Note that the process of step S74 need not necessarily be performed.

As described above, the client 12 receives the rendering voice from the server 11, and presents the presentation voice and the virtual communication space image to the user.

As described above, presenting the presentation voice obtained from the rendering voice allows the voice of the speaker to be easily recognized. In addition, it is possible to realize a more natural acoustic presentation without delay by generating the presentation voice from the rendering voice for each orientation of the user who is a listener.

<Configuration Example of Information Processing Unit>

Note that, although the example where the rendering voice is generated on the server 11 side has been described above, the rendering voice may be generated on the client 12 side. In such a case, the information processing unit 87 of the client 12 has a configuration illustrated in FIG. 18, for example.

Figure 18:
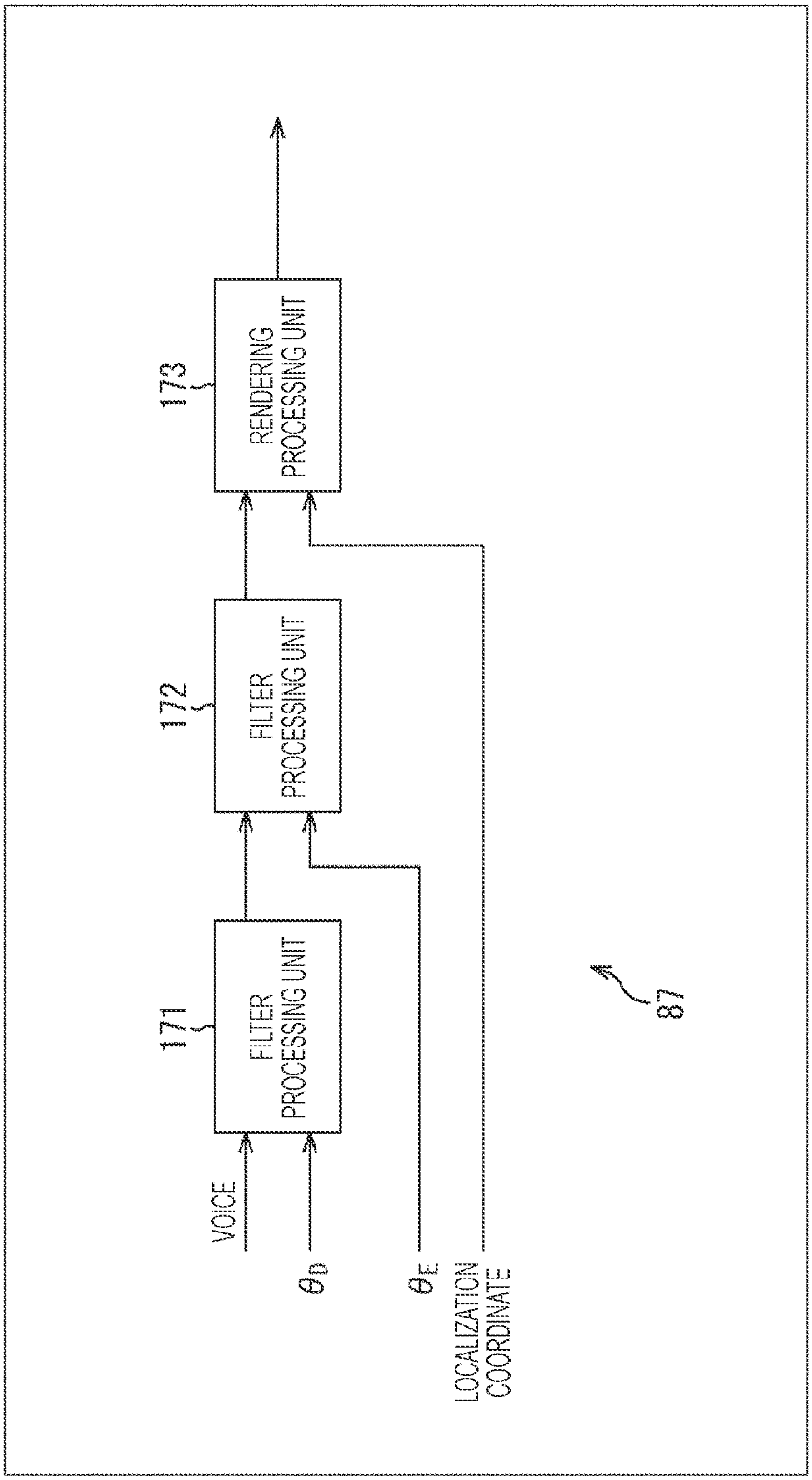
FIG. 18 is a diagram illustrating a configuration example of an information processing unit.

In the example illustrated in FIG. 18, the information processing unit 87 includes a filter processing unit 171, a filter processing unit 172, and a rendering processing unit 173. The filter processing unit 171 to the rendering processing unit 173 correspond to the filter processing unit 131 to the rendering processing unit 133 illustrated in FIG. 14, and basically perform the same operation, so that no detailed description will be given below of the filter processing unit 171 to the rendering processing unit 173.

Figure 17:
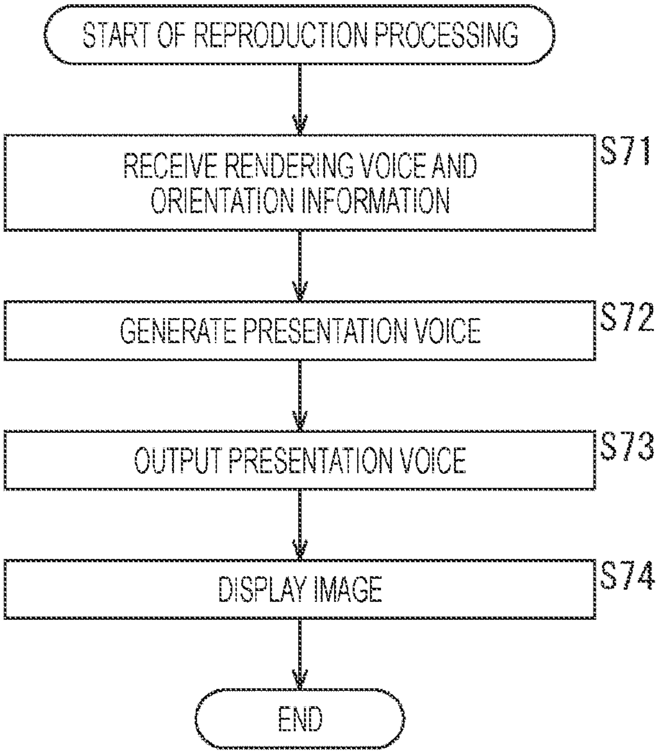
FIG. 17 is a flowchart for describing reproduction processing.

In a case where the rendering voice is generated on the client 12 side, in step S71 of the reproduction processing described with reference to FIG. 17, the recorded voice of the speaker and the orientation information of the speaker are received from the server 11. Furthermore, in a case where the user is not allowed to designate the location of the other user in the virtual communication space, the virtual location information of the other user is further received from the server 11 in step S71.

Figure 16:
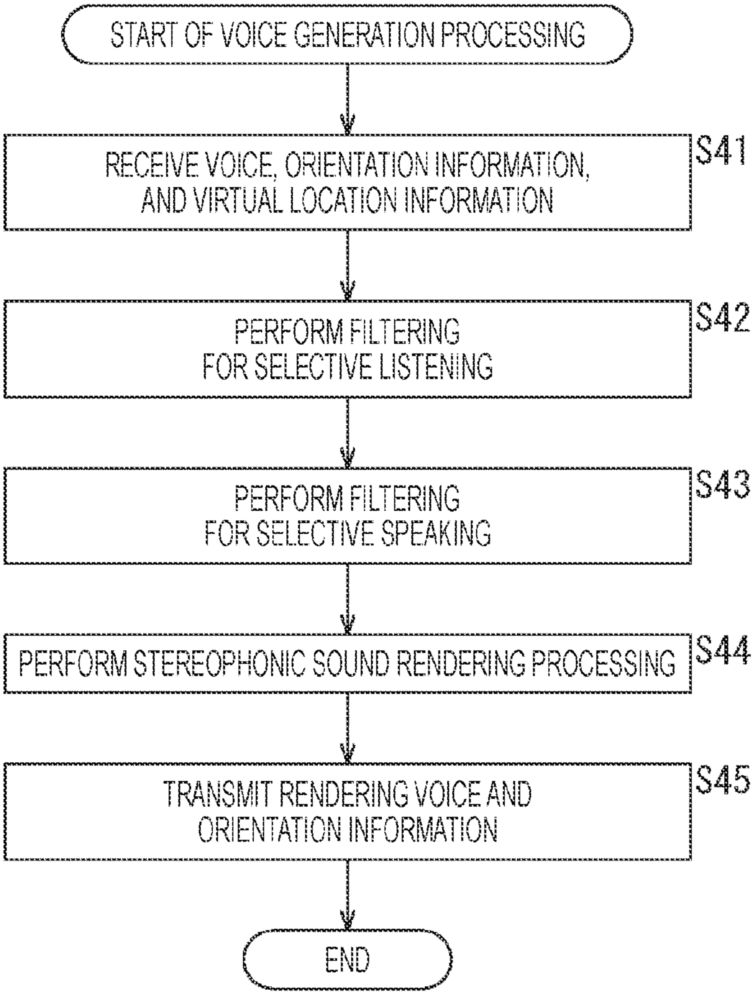
FIG. 16 is a flowchart for describing voice generation processing.

Then, after the process of step S71 is performed, the information processing unit 87 performs processes similar to steps S42 to S44 in FIG. 16 to generate a rendering voice.

Note that, in this case, the orientation information indicating the current orientation of the user may be acquired from the orientation sensor 81 by the information processing unit 87, and the angle difference $\theta_D$ and the angle difference $\theta_E$ may be obtained on the basis of the orientation information, the virtual location information of the user, and the virtual location information and orientation information of the other user.

Furthermore, the information processing unit 87 performs preprocessing on the recorded voice of the speaker and calculation of localization coordinates. At this time, the current orientation information and virtual location information of the user (listener), and the virtual location information of the other user who is a speaker may be used for the calculation of localization coordinates.

Then, the generation of the filter $A_D$ by the filter processing unit 171 and the filtering using the filter $A_D$ on the voice of the speaker that has been subjected to the preprocessing are performed. Furthermore, the generation of the filter $A_E$ by the filter processing unit 172 and the filtering of the voice of the speaker using the filter $A_E$ are further performed.

Moreover, the rendering processing unit 173 subsequently performs stereophonic sound rendering processing on the basis of the localization coordinates and the voice supplied from the filter processing unit 172.

In this case, the rendering processing unit 173 performs, for example, binaural processing based on the HRTF data read from the memory 83 on the basis of the localization coordinates and the voice of the speaker, filtering for adjusting frequency characteristics in accordance with the localization coordinates, and the like to generate a rendering voice.

In particular, in this example, since the current orientation information of the user who is a listener can be obtained at the time of the binaural processing (stereophonic sound rendering processing), only the rendering audio A (θ, φ, ψ, x, y, z) for the current orientation of the user (listener) may be generated.

In such a case, in step S72 to be performed later, one generated rendering voice is used as it is as the presentation voice.

<About User Arrangement Location Adjustment>

Furthermore, in the present technology, the server 11 can compare arrival directions of a plurality of spoken voices as viewed from the listener himself/herself to adjust intervals between arrangement locations of speakers in the virtual communication space so as to prevent an angle formed by the arrival directions from falling below a preset minimum interval (angle).

Furthermore, in a case where it is difficult to perform such an arrangement location adjustment, the communication frequency is analyzed for each communication group or speaker, the communication group or speaker having a higher communication frequency may take precedence over the other communication groups or speakers (given a higher degree of priority) such that the intervals between users can be secured, and the other communication groups or speakers may be lowered in degree of priority.

In such a case, the arrangement location of each user in the virtual communication space is adjusted so as to keep a voice with a higher degree of priority in a recognizable state by selecting a voice that needs to secure the minimum interval in accordance with the assigned degree of priority.

Figure 19:
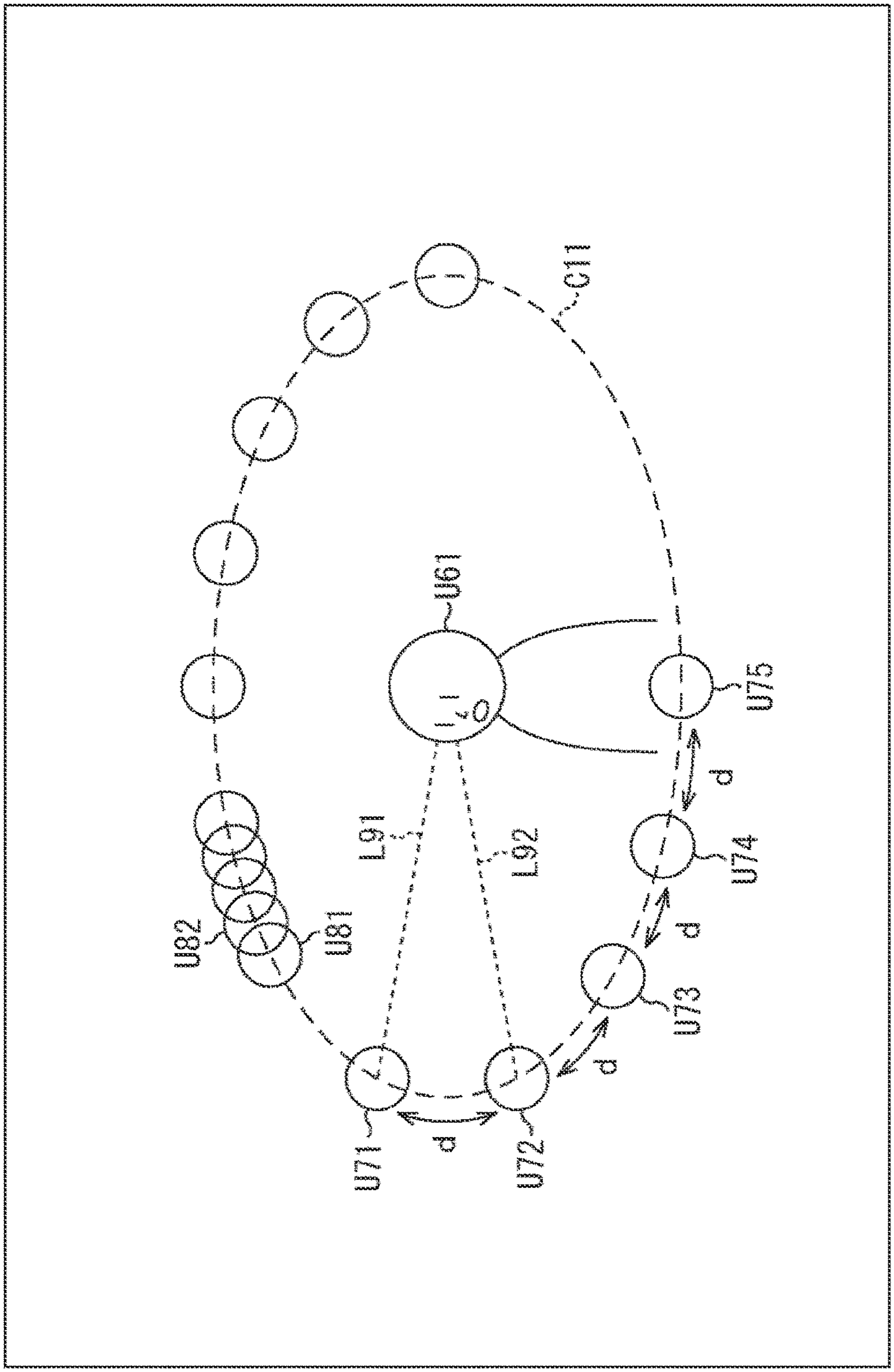
FIG. 19 is a diagram for describing adjustment of distribution of localization locations of sound images.

As a result, a degree of concentration of sound sources (speakers) is controlled in accordance with communication frequencies, and for example, the arrangement location of each user in the virtual communication space is adjusted as illustrated in FIG. 19. Note that, in FIG. 19, for simplicity of the description, all users who are speakers are arranged on one circle C11.

In this example, a user U61 is a listener, and a plurality of other users are arranged on the circle C11 centered on the user U61. Here, one circle represents one user.

A communication group including the users U71 to U75 arranged almost directly in front of the user U61 is a communication group having the highest priority score, that is, the highest degree of priority. Therefore, the users U71 to U75 belonging to the communication group are arranged apart from each other at predetermined intervals, that is, by an angle d.

That is, for example, an angle formed by a line L91 connecting the user U61 and the user U71 and a line L92 connecting the user U61 and the user U72 is the angle d. Here, the angle d indicates a minimum angle difference indicating the minimum interval that needs to be secured in the distribution (localization distribution) of localization locations of the voices of speakers.

Here, since the users U71 to U75 having the highest degree of priority are arranged apart from each other at intervals corresponding to the angle d, the user U61 can sufficiently easily recognize each of the spoken voices of the users U71 to U75.

Furthermore, a communication group including five users (speakers) including the user U81 and the user U82 arranged on the right side as viewed from the user U61 includes users that are lower in priority score than the other users and the other communication groups such as the user U71 to the user U75.

In this example, all the users cannot be arranged apart from each other at the intervals corresponding to the angle d, so that the users U81 and U82 belonging to the communication group having the lowest priority score are arranged at intervals shorter than the intervals corresponding to the angle d.

In this case, the user U81 and the like having a lower priority score are arranged at shorter intervals, but such users having a lower priority score communicate with a low frequency, so that it is possible to prevent the user U61 from facing difficulty in recognizing the spoken voice of each speaker. In other words, as a whole, the user U61 can sufficiently recognize the spoken voice of each speaker.

Here, a specific example of the user arrangement location adjustment based on the priority score will be described.

For example, the number of speakers in the tele-communications is N, and the speakers are referred to as speakers 1 to N.

First, the information processing unit 43 obtains speaking frequencies F1 to FN of the speakers 1 to N during a period from the current time to T seconds before that is a predetermined time length (hereinafter, referred to as target period T) on the basis of the recorded voice of each speaker from the past to the present.

Since the spoken voice (recorded voice) of each speaker is always collected in the server 11 once, the information processing unit 43 can obtain a time $T_n$ (where n=1, 2, . . . , N) at which the speaker n spoke in the target period T on the basis of the recorded voice of the speaker n.

For example, the information processing unit 43 obtains the speaking frequency $F_n=T_n/T$ of the speaker n by dividing the time Tn at which the speaker n spoke by the target period T.

Note that whether or not the speaker n is speaking is determined on the basis of, for example, the amplitude of the recorded voice of the speaker, whether or not the microphone sound pressure at the time of sound collection is greater than or equal to a certain level, whether or not the recorded voice is recognized as a voice by voice recognition, the expression of the user such as whether or not the mouth is moving on an image captured by a camera, or the like. Note that information indicating whether or not each user (speaker) is speaking may be generated by the information processing unit 43 or may be generated by the information processing unit 87.

Furthermore, as a generalized derivative form, a method for obtaining the speaking frequency Fn in which the more recent the speaking, the larger the weight assigned is also applicable.

For example, it is also possible to set the speaking frequency $Fn=\Sigma W(t)Sn(t)$ using a weighting filter W(t) that is a predetermined weight and a speaking amount Sn (t) of the speaker n at the time t.

In this case, for example, if it is defined that $W(t)=1/T$, the speaking amount $Sn(t)=1$ when the speaker n speaks at the time t, and the speaking amount $Sn(t)=0$ when the speaker n does not speak at the time t, $Fn=T_n/T$ is established as in the above-described example.

Furthermore, the information processing unit 43 sets, for example, a group including one or a plurality of users satisfying a predetermined condition as one communication group.

Note that an example where the priority score is calculated for a communication group will be described below, but the priority score may be calculated for each user (speaker).

For example, a group including predetermined users, a group including users sitting on the same table in the virtual communication space, a group including users located within an area of a predetermined size in the virtual communication space, or the like are set as one communication group. Basically, users arranged close to each other belong to the same communication group.

At this time, the information processing unit 43 further obtains a speaking amount G and a communication dispersion degree D for each communication group on the basis of the speaking amount Sn(t) and speaking frequency Fn of each speaker n (user).

For example, when one communication group includes N speakers including the speaker 1 to the speaker N, the speaking amount G of the communication group can be obtained by $G=\Sigma W(t)\max(S1(t), \ldots, SN(t))$. In this case, the speaking amount G is obtained by adding up the largest speaking amount Sn (t) at each time t with the weight (W(t)) assigned to the largest speaking amount Sn(t).

Furthermore, the communication dispersion degree D is defined by, for example, $D=(\Sigma(Fn-\mu)^2)/N$. Note that μ in the communication dispersion degree D is a mean value of the speaking frequencies Fn.

Moreover, the information processing unit 43 sets arbitrarily settable coefficients as a, b, and c, and obtains a priority score P of the communication group by $P=aG+bD+c(G^*D)^{1/2}$. It can be said that the priority score P of such a communication group is the priority score P of the users belonging to the communication group.

When the priority score P is obtained for each communication group, the information processing unit 43 adjusts the arrangement location of the speaker so as to allow the minimum angle d of the sound image localization distribution as viewed from the listener to be secured in order from a member (speaker) of the communication group having a higher priority score P.

At this time, the lower the priority score P of a communication group, the smaller an area in the virtual communication space where a member (speaker) of the communication group can be arranged. Therefore, there is a case where it is difficult to arrange the speaker of the communication group having a lower priority score P with the minimum angle d of the localization distribution maintained.

In such a case, for example, all the members of the communication group having a lower priority score P may be arranged at the same location (one point), or with an angle that can be secured at the present time equally assigned to the remaining speakers (speakers having a lower priority score P), the speakers may be arranged at intervals corresponding to the angle.

By doing so, it is possible to keep the voice of the speaker belonging to the communication group having a higher priority score P sufficiently high in ease of recognition.

Note that it is assumed that, as the tele-communications are performed and time elapses, the order of the priority score P of each communication group varies, or a direction in which the communication group is located as viewed from the listener varies with a change of the location of the speaker or the listener. In that case, if a change in the localization distribution is immediately reflected in the location of each speaker, the change in the location becomes discrete.

Therefore, for example, in a case where a difference (distance) between the current localization location of the voice of the speaker and a new localization location after update is greater than or equal to a predetermined value, the information processing unit 87 causes the sound image location, that is, the arrangement location of the speaker in the virtual communication space to move continuously and gradually over a certain period of time. Specifically, for example, the information processing unit 87 continuously moves the location of the speaker by means of an animation display on the virtual communication space image. As a result, the listener can instantaneously grasp that the location of the speaker (sound image localization location) is moving.

In a case where the speaker arrangement adjustment as described above is performed on the server 11 side, the information processing unit 43 determines whether or not the speaker arrangement location adjustment is necessary at a timing when the virtual location information of a predetermined user is updated or the like.

As a specific example, a case where attention is paid to one user, the user is a listener, and the other user is a speaker will be described.

Here, an angle formed by a direction of the predetermined speaker as viewed from the listener and a direction of the other speaker as viewed from the listener is referred to as inter-speaker angle. Furthermore, a state where the inter-speaker angle between the speakers is greater than or equal to the above-described angle d as viewed from the listener is also referred to as state where the minimum interval d of the localization distribution is maintained.

Furthermore, in the processing to be described below, in a case where a user who is a listener is allowed to designate the virtual location information of the other user, the information processing unit 43 uses the virtual location information of the other user (speaker) (designated by the listener) received from the client 12 of the listener for the processing.

On the other hand, in a case where the user who is a listener is not allowed to designate the virtual location information of the other user, the information processing unit 43 uses the virtual location information of the other user (speaker) (designated by the speaker) received from the client 12 of the other user for the processing.

The information processing unit 43 determines that, in a case where the arrangement state of each speaker is the state where the minimum interval d of the localization distribution is maintained as viewed from the listener, the arrangement location of the speaker need not be adjusted on the basis of the virtual location information of each user. In this case, the arrangement location of the speaker is not particularly adjusted.

On the other hand, in a case where the state of arrangement of each speaker is a state where the minimum interval d of the localization distribution is not maintained as viewed from the listener, the information processing unit 43 determines that the arrangement location of the speaker needs to be adjusted.

In this case, the information processing unit 43 adjusts the arrangement location of the speaker having the inter-speaker angle less than the angle d, for example, such that the arrangement state of each speaker is the state where the minimum interval d of the localization distribution is maintained. At this time, if necessary, the arrangement location of the other speaker having the inter-speaker angle not less than the angle d may also be adjusted.

In other words, the information processing unit 43 adjusts (changes) the arrangement location of one or a plurality of speakers in the virtual communication space so as to make the inter-speaker angle greater than or equal to the angle d between all the speakers.

When the arrangement location of the speaker in the virtual communication space is adjusted as described above, the virtual location information of some or all of the speakers is updated.

After the arrangement location is adjusted, the information processing unit 43 performs the processes of steps S42 to S44 in the above-described voice generation processing using the updated virtual location information. Furthermore, the communication unit 41 transmits the updated virtual location information to the client 12 of the user who is a listener, and also updates the virtual location information of the speaker held by the client 12.

Furthermore, in a case where the minimum interval d of the localization distribution is not maintained, even if the arrangement locations of all the speakers are adjusted, there is a possibility that the minimum interval d of the localization distribution is not maintained.

Figure 20:
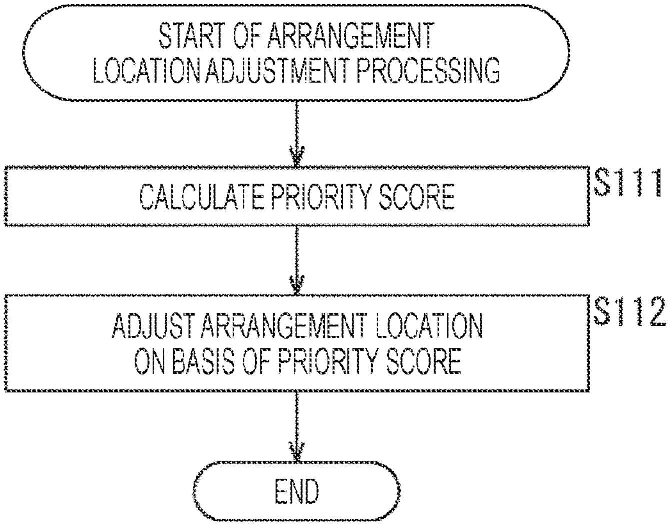
FIG. 20 is a flowchart for describing arrangement location adjustment processing.

In such a case, the server 11 performs arrangement location adjustment processing illustrated in FIG. 20, for example.

Next, the arrangement location adjustment processing performed by the server 11 will be described with reference to the flowchart in FIG. 20.

In step S111, the information processing unit 43 calculates the priority score P of each communication group on the basis of the recorded voice of each speaker.

In other words, the information processing unit 43 obtains the speaking amount G and the communication dispersion degree D for each communication group on the basis of the recorded voice of each speaker, and calculates the priority score P for each communication group from the speaking amount G and the communication dispersion degree D.

In step S112, the information processing unit 43 adjusts the arrangement location of each speaker in the virtual communication space on the basis of the priority score P. That is, the information processing unit 43 updates (changes) the virtual location information of each speaker.

Specifically, for example, the information processing unit 43 sets a speaker belonging to a communication group having a priority score P greater than or equal to a predetermined value (high degree of priority) or a communication group having the highest priority score P as a speaker to be processed. The information processing unit 43 adjusts (changes) the arrangement locations of the speakers to be processed so as to make the inter-speaker angle between the speakers to be processed equal to the angle d.

At this time, the arrangement locations of speakers other than the speakers to be processed may also be adjusted as necessary so as to make the inter-speaker angle between the speakers to be processed equal to the angle d. Furthermore, for example, at least the angle d is secured as the inter-speaker angle between the speakers to be processed and any other speaker.

In such a state, when an angle formed by a direction of a speaker to be processed arranged on the rightmost side as viewed from the listener and a direction of a speaker to be processed arranged on the leftmost side as viewed from the listener is denoted as $\alpha$, an angle $\beta$ obtained by subtracting the angle $\alpha$ and the angle 2d from 360 degrees is the remaining angle. The remaining angle $\beta$ is an angle (inter-speaker angle) that can be allocated to each speaker in the adjustment of the arrangement of speakers belonging to a communication group with a low degree of priority, such as a communication group with the priority score P less than the predetermined value or a communication group with the lowest priority score P.

Next, the information processing unit 43 sets a speaker belonging to a communication group that has yet to be set as a processing target (with a low degree of priority), such as a communication group with the priority score P less than the predetermined value, as a speaker to be processed.

Then, the information processing unit 43 adjusts (changes) the arrangement locations of the speakers to be processed so as to make the inter-speaker angle between the speakers to be processed equal to an angle d' that is smaller than the angle d. At this time, the arrangement locations of the speakers other than the speakers to be processed may also be adjusted as necessary so as to make the inter-speaker angle between the speakers to be processed equal to the angle d' smaller than the angle d.

For example, the information processing unit 43 equally assigns (distributes) the remaining angle $\beta$ to each speaker to be processed.

For example, in a case where the total number of speakers belonging to a communication group having the priority score P less than the predetermined value is four, the information processing unit 43 adjusts the arrangement locations of the speakers to be processed so as to make the inter-speaker angle between the speakers to be processed equal to $\beta/3$.

Note that, for example, in a case where the remaining angle $\beta$ or the priority score P of a communication group is extremely small (the priority score P is less than or equal to a threshold), all the speakers to be processed may be arranged at the same location in the virtual communication space.

After the arrangement locations are adjusted for all the speakers to be processed as described above, the information processing unit 43 updates the virtual location information of each speaker in accordance with the adjustment result.

Then, the information processing unit 43 performs the processes of steps S42 to S44 in the above-described voice generation processing using the updated virtual location information from this point onward.

Furthermore, the information processing unit 43 supplies the updated virtual location information to the communication unit 41, and the communication unit 41 transmits the virtual location information supplied from the information processing unit 43 to the client 12 of the user who is a listener. In this case, the client 12 also performs the reproduction processing described with reference to FIG. 17 on the basis of the updated virtual location information from this point onward.

At this time, for example, in step S74, the information processing unit 87 causes the display unit 85 to display the virtual communication space image on the basis of the updated virtual location information received from the server 11. At that time, the information processing unit 87 outputs, as necessary, an animation display in which an image representing the speaker in the virtual communication space image moves continuously and gradually.

When the updated virtual location information is transmitted to the client 12, the arrangement location adjustment processing is brought to an end.

As described above, the server 11 calculates the priority score P, and adjusts the arrangement location of the speaker on the basis of the priority score P. As a result, a speaker with a high degree of priority can be in the state where the minimum interval d of the localization distribution is maintained, so that the voice of the speaker can be easily recognized as a whole.

Note that, when the arrangement location of the speaker is adjusted, the arrangement location of the listener himself/herself may also be adjusted. This allows an increase in degree of freedom in the arrangement location adjustment.

Furthermore, the speaker arrangement location adjustment described above may be performed in the information processing unit 87 of the client 12 rather than the server 11.

In such a case, the client 12 may acquire (receive) the virtual location information of each speaker from the server 11 as necessary, or may use the virtual location information of each speaker designated by the user (listener).

Furthermore, the updated virtual location information may be transmitted to the server 11, and the server 11 may generate the rendering voice using the updated virtual location information, or the client 12 may generate the rendering voice using the updated virtual location information.

Application Example of Present Technology

A specific application example of the present technology described above will be described.

Here, an example where the present technology is implemented as a mobile application will be described.

Figure 21:
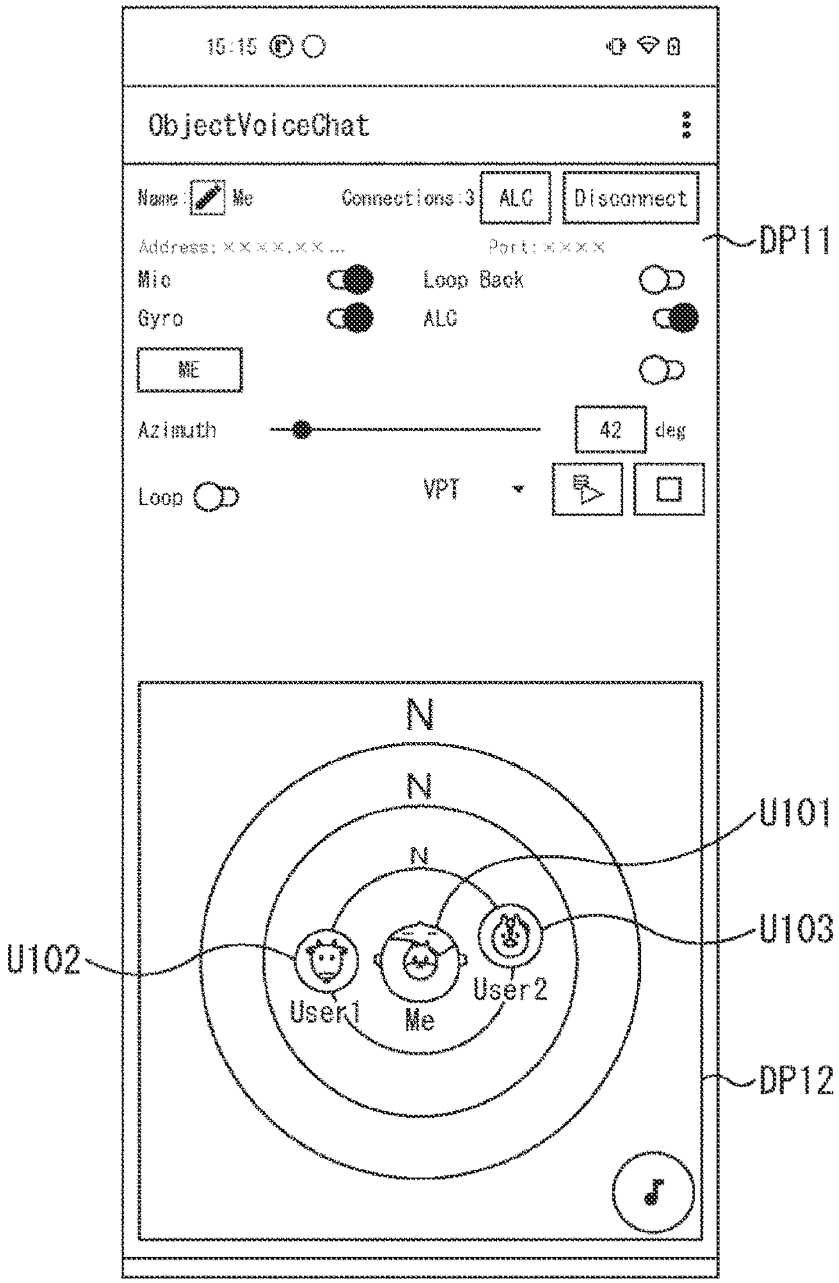
FIG. 21 is a diagram illustrating an example of a display screen.

In such a case, for example, the client 12 is a mobile terminal (smartphone) or the like, and the screen illustrated in FIG. 21 is displayed on the display unit 85, for example. Note that the screen design illustrated in FIG. 21 is merely an example, and is not limited to this example.

In this example, a setting screen DP11 for making various settings for tele-communications and a virtual communication space image DP12 imitating the virtual communication space are displayed on the display screen.

For example, the user can enable or disable the detection of the orientation by operating a toggle button displayed on the right side of characters "Gyro" on the setting screen DP 11 in the drawing.

For example, in a case where the detection of the orientation of the user is enabled, the client 12 detects the orientation of the user one after another and transmits the orientation information obtained as a result of the detection to the server 11.

On the other hand, in a case where the detection of the direction of the user is disabled, the orientation information is not transmitted to the server 11. That is, the orientation indicated by the orientation information remains fixed. Therefore, in this case, even if the orientation of the user changes, the positional relation between the users in the virtual communication space remains fixed, and the positional relation between the icons each representing a corresponding user on the virtual communication space image DP 12 does not change accordingly.

Characters "Me" representing the user himself/herself and an icon U101 representing the user are displayed at the center position on the virtual communication space image DP12 arranged on the lower side of the screen, and it can be seen that the user faces upward in the drawing in this example.

Furthermore, icons (images) representing the other participants (other users) with the user himself/herself (the icon U 101) as the center are displayed.

In this example, three concentric circles centered on the icon U101 are displayed. Then, an icon U102 of another user identified by a participant name "User 1" (hereinafter, also referred to as user User 1) and an icon U103 of the other user identified by a participant name "User 2" (hereinafter, also referred to as user User 2) are displayed on the smallest circle.

In particular, the icon U102 is arranged on the left side of the icon U101 in the drawing, and the icon U103 is arranged on the right side of the icon U 101 in the drawing. Therefore, it can be seen that the user User 1 is located on the left side as viewed from the user himself/herself (Me), and the user User 2 is located on the right side as viewed from the user himself/herself.

Such a display allows the user to grasp from which direction the voices of the other participants, that is, the user User 1 and the user User 2 are heard. In other words, in the virtual communication space image DP12, from which direction the user hears the voices of the other participants is indicated by the icons and the display positions of the participant names.

Furthermore, regarding the three concentric circles centered on the icon U101, the farther the circle on which a participant is located is from the center, that is, the farther the participant is from the icon U101, the farther the participant is from the user (Me).

Furthermore, the arrangement location of each icon on the circle indicates a direction in which the voice of a corresponding participant is localized, for example, a participant displayed on the upper side as viewed from the user (the icon U101) is located in front of the user, a participant displayed on the right side as viewed from the user is located on the right side of the user, and a participant displayed on the lower side as viewed from the user is located behind (at the back of) the user.

In a mobile application (client 12), a mobile terminal orientation sensor or a headphone orientation sensor is used as the orientation sensor 81 for the orientation information of the user. Furthermore, the mobile application receives the orientation information indicating the orientation of the user from the orientation sensor, and changes the direction of the voice of another participant in real time in accordance with a change in the orientation of the user.

For example, in the state illustrated in FIG. 21, the voice of the user User 1 can be heard from the left side of the user, and the voice of the user User 2 can be heard from the right side of the user.

Figure 22:
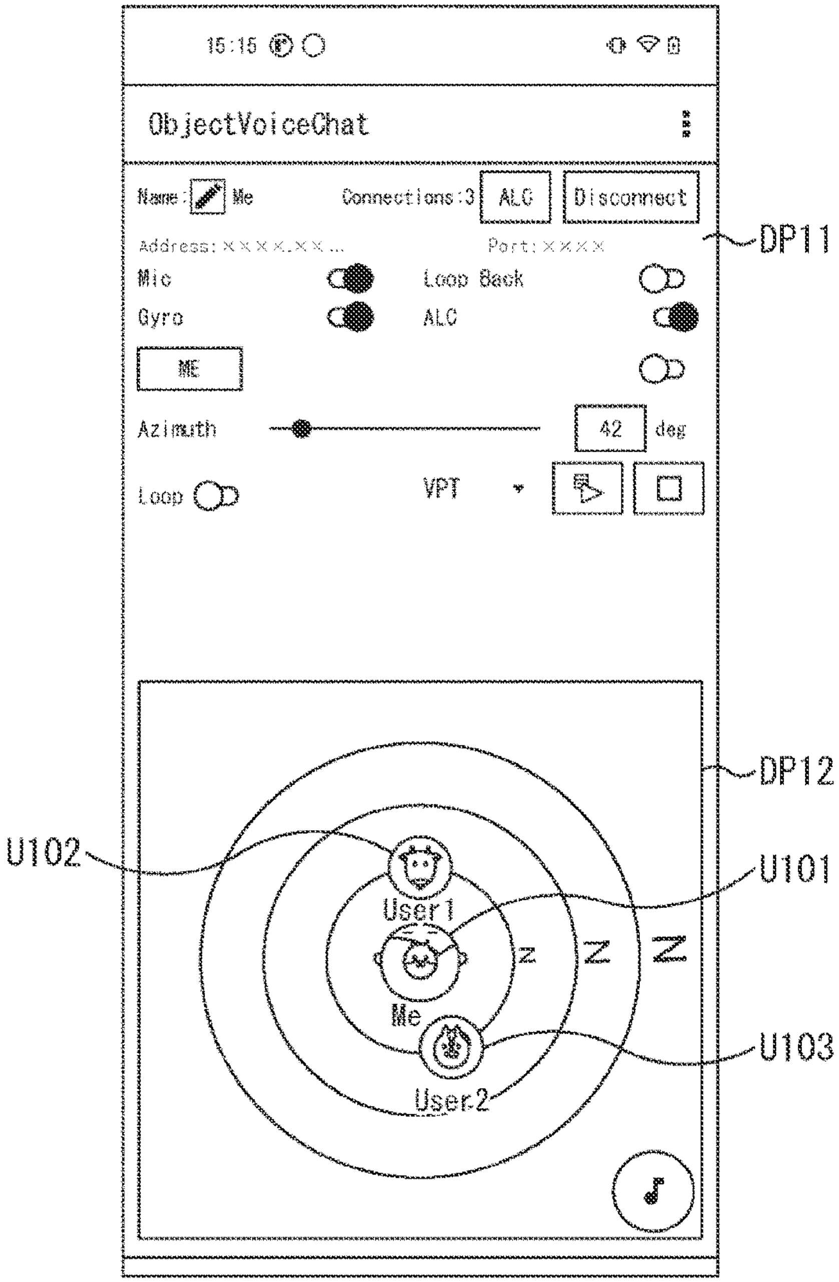
FIG. 22 is a diagram illustrating an example of the display screen.

In this state, for example, when the user (Me) turns toward the direction from which the voice of the user User 1 is heard as a target of selective listening or selective speaking, the display of the virtual communication space image DP 12 changes to, for example, a display as illustrated in FIG. 22.

As a result, the user is in a state where the user faces the user User 1 and is listening to the voice of the user User 1.

For example, when the user changes the orientation of the mobile terminal equipped with the built-in orientation sensor 81, the orientation sensor 81 detects a change in the orientation of the mobile terminal as a change in the orientation (orientation information) of the user.

In the state illustrated in FIG. 22, the voice (sound image) of the user User 1 is arranged in the front direction as viewed from the user (Me), and the voice of the user User 1 can be clearly heard. On the other hand, since the voice (sound image) of the user User 2 moves to the right rear side as viewed from the user (Me), the voice of the user User 2 is heard as a muffled voice due to the filter $A_D$ of the selective listening.

As a result, the voice of the user User 1 is heard at a location or with sound quality that makes the voice easy to hear, and the voice of the user User 2 can be heard but does not disturb the user User 1.

Moreover, when the user himself/herself (Me) speaks in the state illustrated in FIG. 22, his/her voice is transmitted as a voice that is easy for the user User 1 to hear and is difficult for the user User 2 to hear due to the filter $A_E$ of the selective speaking. This allows the user to recognize that the user User 1 speaks to the user and allows the user to recognize that the user User 2 speaks to a person other than the user.

Figure 23:
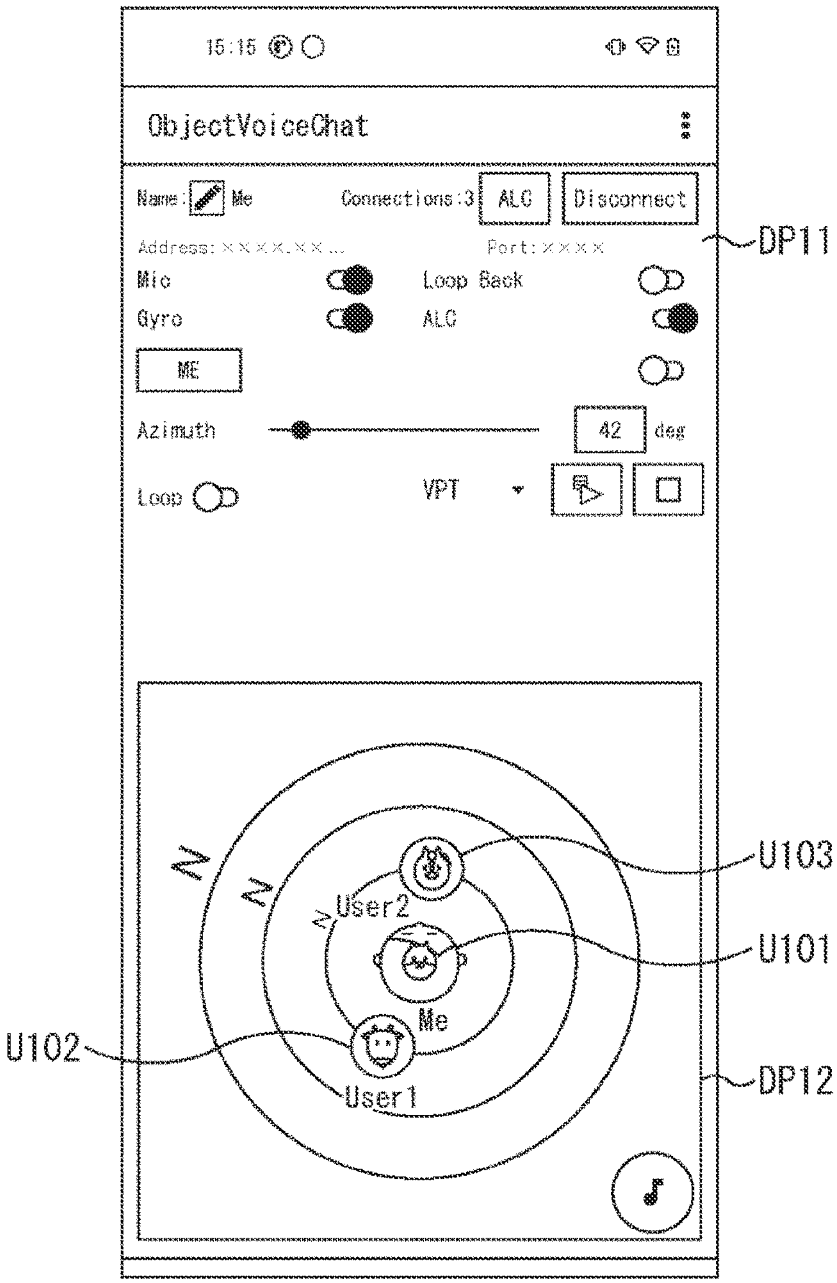
FIG. 23 is a diagram illustrating an example of the display screen.

Thereafter, when the user himself/herself (Me) turns toward the user User 2, the situation changes, and the display of the virtual communication space image DP 12 changes to, for example, a display as illustrated in FIG. 23.

In this state, the user User 2 is located in front of the user (Me), and the user User 1 is located behind the user, so that the voice of the user User 2 becomes easy to hear, and the voice of the user User 1 becomes difficult to hear.

As described above, it is possible to realize the selective listening and the selective speaking by acquiring the orientation of the user in real time in the mobile terminal and applying, to the voice of another user, a filter corresponding to the orientation.

<Configuration Example of Computer>

Note that, the above-described series of processing may be executed by hardware or software. In a case where the series of processing is executed by the software, a program constituting the software is installed on a computer. Here, examples of the computer include a computer incorporated in dedicated hardware, and for example, a general-purpose personal computer capable of executing various functions by installing various programs.

Figure 24:
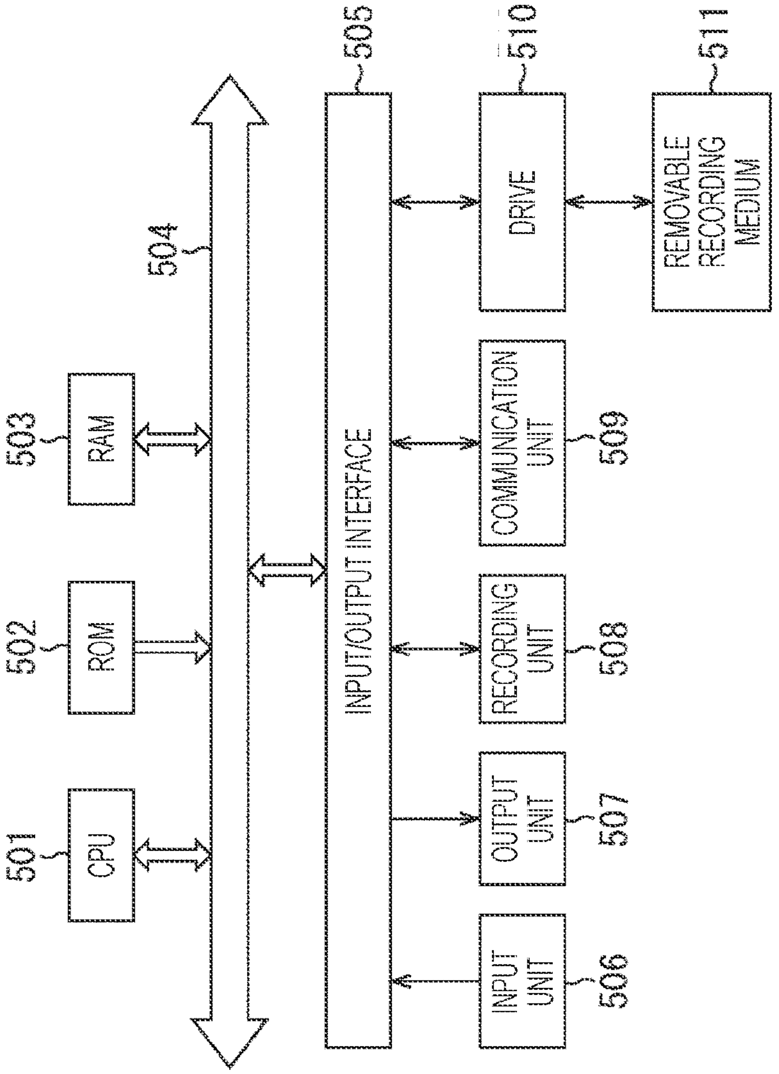
FIG. 24 is a diagram illustrating a configuration example of a computer.

FIG. 24 is a block diagram illustrating a configuration example of hardware of a computer that executes the above-described series of processing by a program.

In the computer, a CPU 501, a read only memory (ROM) 502, and a random access memory (RAM) 503 are mutually connected by a bus 504.

Moreover, an input/output interface 505 is connected to the bus 504. An input unit 506, an output unit 507, a recording unit 508, a communication unit 509, and a drive 510 are connected to the input/output interface 505.

The input unit 506 includes a keyboard, a mouse, a microphone, an imaging element, and the like. The output unit 507 includes a display, a speaker, and the like. The recording unit 508 includes a hard disk, a non-volatile memory, and the like. The communication unit 509 includes a network interface and the like. The drive 510 drives a removable recording medium 511 such as a magnetic disk, an optical disc, a magneto-optical disk, or a semiconductor memory.

In the computer configured as described above, the CPU 501 loads, for example, a program recorded in the recording unit 508 into the RAM 503 via the input/output interface 505 and the bus 504, and executes the program, so as to execute the above-described series of processing.

The program executed by the computer (CPU 501) can be provided by being recorded on the removable recording medium 511 as a package medium, or the like, for example. Furthermore, the program may be provided via a wired or wireless transmission medium, such as a local area network, the Internet, or digital satellite broadcasting.

In the computer, the program can be installed in the recording unit 508 via the input/output interface 505 by mounting the removable recording medium 511 to the drive 510. Furthermore, the program can be received by the communication unit 509 via the wired or wireless transmission medium to be installed on the recording unit 508. In addition, the program can be installed in the ROM 502 or the recording unit 508 in advance.

Note that the program executed by the computer may be a program that executes processing in time series according to an order described in this specification, or may be a program that performs processing in parallel or at necessary timing such as when a call is made.

Furthermore, the embodiments of the present technology are not limited to the above-described embodiments, and various modifications are possible without departing from the scope of the present technology.

For example, the present technology may be configured as cloud computing in which one function is shared by a plurality of devices via the network to process together.

Furthermore, each step described in the flowcharts described above may be executed by one device, or may be executed by a plurality of devices in a shared manner.

Moreover, in a case where one step includes a plurality of kinds of processing, the plurality of kinds of processing included in the one step may be executed by one device, or may be executed by a plurality of devices in a shared manner.

Moreover, the present technology may also have following configurations.

(1)

An information processing device including an information processing unit configured to generate, on the basis of orientation information indicating an orientation of a listener, virtual location information indicating a location of the listener in a virtual space, the location being set by the listener, and virtual location information of a speaker, a voice of the speaker localized at a location corresponding to the orientation and location of the listener and the location of the speaker.

(2)

The information processing device according to (1), in which a location of the speaker in the virtual space indicated by the virtual location information of the speaker is set by the listener.

(3)

The information processing device according to (1) or (2), further including a communication unit configured to receive the orientation information and the virtual location information of the listener from a client of the listener and transmit the voice of the speaker to the client of the listener.

(4)

The information processing device according to any one of (1) to (3), in which the information processing unit generates the voice of the speaker by performing acoustic processing including binaural processing.

(5)

The information processing device according to any one of (1) to (4), in which the information processing unit generates the voice of the speaker such that the voice of the speaker is clearly heard as a direction of the speaker as viewed from the listener becomes closer to a front direction of the listener.

(6)

The information processing device according to (5), in which the information processing unit generates the voice of the speaker on the basis of directivity designated by the listener.

(7)

The information processing device according to any one of (1) to (6), in which the information processing unit generates the voice of the speaker such that the voice of the speaker is clearly heard as a front direction of the speaker becomes closer to a direction of the listener as viewed from the speaker.

(8)

The information processing device according to (7), in which the information processing unit generates the voice of the speaker on the basis of directivity designated by the speaker.

(9)

The information processing device according to any one of (1) to (8), in which the information processing unit adjusts a location of one or a plurality of the speakers in the virtual space so as to make an inter-speaker angle formed by the direction of the speaker viewed from the listener and a direction of another speaker viewed from the listener greater than or equal to a predetermined minimum angle.

(10)

The information processing device according to (9), in which in a case where the information processing unit fails to arrange all the speakers in the virtual space so as to make the inter-speaker angle between all the speakers greater than or equal to the minimum angle, the information processing unit calculates a degree of priority of the speaker on the basis of the voice of the speaker, and adjusts the location of one or a plurality of the speakers in the virtual space so as to make the inter-speaker angle between the speakers with a high degree of priority equal to the minimum angle.

(11)

The information processing device according to (10), in which the information processing unit adjusts the location of one or a plurality of the speakers in the virtual space so as to make the inter-speaker angle between the speakers with a low degree of priority equal to an angle smaller than the minimum angle.

(12)

The information processing device according to (10), in which the information processing unit adjusts the location of one or a plurality of the speakers in the virtual space such that a plurality of the speakers with the low degree of priority is arranged at a same location in the virtual space.

(13)

The information processing device according to any one of (10) to (12), in which the information processing unit calculates the degree of priority for each group including one or a plurality of the speakers.

(14)

The information processing device according to any one of (10) to (13), in which the information processing unit calculates the degree of priority based on a speaking frequency of the speaker.

(15)

The information processing device according to any one of (1) to (14), in which the information processing unit generates the voice of the speaker for each of a plurality of orientations including the orientation of the listener indicated by the orientation information.

(16)

The information processing device according to (1) or (2), in which the information processing unit causes a display unit to display a virtual space image indicating a positional relation between the listener and the speaker in the virtual space.

(17)

An information processing method including generating, on the basis of orientation information indicating an orientation of a listener, virtual location information indicating a location of the listener in a virtual space, the location being set by the listener, and virtual location information of a speaker, a voice of the speaker localized at a location corresponding to the orientation and location of the listener and the location of the speaker by an information processing device.

(18)

A program causing a computer to execute processing, the processing including generating, on the basis of orientation information indicating an orientation of a listener, virtual location information indicating a location of the listener in a virtual space, the location being set by the listener, and virtual location information of a speaker, a voice of the speaker localized at a location corresponding to the orientation and location of the listener and the location of the speaker.

REFERENCE SIGNS LIST

11 Server
12 Client
41 Communication unit
43 Information processing unit
71 Voice output device
81 Orientation sensor
82 Sound collection unit
84 Communication unit
85 Display unit
87 Information processing unit
131 Filter processing unit
132 Filter processing unit
133 Rendering processing unit
171 Filter processing unit

172 Filter processing unit
173 Rendering processing unit

The invention claimed is:

1. An information processing device, comprising:

an information processing unit configured to:

generate, based on orientation information, first virtual location information, and second virtual location information, voices of a plurality of speakers, wherein a voice, of the generated voices, corresponding to a speaker of the plurality of speakers is localized at a specific location corresponding to an orientation of a listener, a first location of the listener, and a second location of the speaker, the orientation information includes the orientation of the listener, the first virtual location information includes the first location of the listener in a virtual space, the first location is set by the listener, and the second virtual location information includes the second location of each speaker of the plurality of speakers;

adjust a third location of at least one first speaker of the plurality of speakers in the virtual space to make an inter-speaker angle greater than or equal to a specific minimum angle, wherein the inter-speaker angle is between a first direction of a first speaker viewed from the listener and a second direction of a second speaker viewed from the listener;

calculate a degree of priority of the each speaker of the plurality of speakers based on the generated voices, wherein the degree of priority is calculated subsequent to a failure of the information processing unit to arrange the plurality of speakers in the virtual space with the inter-speaker angle between two adjacent speakers of the plurality of speakers greater than or equal to the specific minimum angle; and adjust, based on the calculated degree of priority, a fourth location of at least one second speaker of the plurality of speakers in the virtual space to make the inter-speaker angle between first priority speakers, of the plurality of speakers, greater than or equal to the specific minimum angle, wherein a priority of each first priority speaker of the first priority speakers is greater than a specific value.

2. The information processing device according to claim 1, wherein the second location of the speaker in the virtual space indicated by the second virtual location information of the speaker is set by the listener.

3. The information processing device according to claim 1, further comprising a communication unit configured to:

receive the orientation information and the first virtual location information from a client of the listener; and transmit the voices of the plurality of speakers to the client of the listener.

4. The information processing device according to claim 1, wherein the information processing unit is further configured to generate the voices of the plurality of speakers by an acoustic process, and the acoustic process includes a binaural process.

5. The information processing device according to claim 1, wherein the information processing unit is further configured to generate the voices of the plurality of speakers such that the voice of a respective speaker of the plurality of speakers is clearly heard as a direction of the respective speaker as viewed from the listener becomes closer to a front direction of the listener.

6. The information processing device according to claim 5, wherein the information processing unit is further configured to generate the voices of the plurality of speakers based on directivities designated by the listener, and the directivities are associated with the plurality of speakers.

7. The information processing device according to claim 1, wherein the information processing unit is further configured to generate the voices of the plurality of speakers such that the voice of a respective speaker of the plurality of speakers is clearly heard as a front direction of the respective speaker becomes closer to a direction of the listener as viewed from the respective speaker.

8. The information processing device according to claim 7, wherein the information processing unit is further configured to generate the voices of the plurality of speakers based on directivities designated by the plurality of speakers, and the directivities are associated with the plurality of speakers.

9. The information processing device according to claim 1, wherein the information processing unit is further configured to adjust, based on the calculated degree of priority, a fifth location of at least one third speaker of the plurality of speakers in the virtual space to make the inter-speaker angle between second priority speakers of the plurality of speakers smaller than the specific minimum angle, and the priority of each second priority speaker of the second priority speakers is less than the specific value.

10. The information processing device according to claim 1, wherein the information processing unit is further configured to adjust, based on the calculated degree of priority, a sixth location of at least one fourth speaker of the plurality of speakers in the virtual space such that third priority speakers are at a same location in the virtual space, and a priority of each third priority speaker of the third priority speakers is less than the specific value.

11. The information processing device according to claim 1, wherein the information processing unit is further configured to calculate the degree of priority for each group including at least one fifth speaker of the plurality of speakers.

12. The information processing device according to claim 1, wherein the information processing unit is further configured to calculate the degree of priority of the each speaker, based on a speaking frequency of the each speaker.

13. The information processing device according to claim 1, wherein the information processing unit is further configured to generate the voices of the plurality of speakers for each orientation of a plurality of orientations, and the plurality of orientations includes the orientation of the listener indicated by the orientation information.

14. The information processing device according to claim 1, wherein the information processing unit is further configured to cause a display unit to display a virtual space image, and the virtual space image indicates a positional relation between the listener and the speaker in the virtual space.

15. An information processing method, comprising:

generating, based on orientation information, first virtual location information, and second virtual location information, voices of a plurality of speakers, wherein a voice, of the generated voices, corresponding to a speaker of the plurality of speakers is localized at a specific location corresponding to an orientation of a listener, a first location of the listener, and a second location of the speaker, the orientation information includes the orientation of the listener, the first virtual location information includes the first location of the listener in a virtual space, the first location is set by the listener, and the second virtual location information includes the second location of each speaker of the plurality of speakers;

adjusting a third location of at least one first speaker of the plurality of speakers in the virtual space to make an inter-speaker angle greater than or equal to a specific minimum angle, wherein the inter-speaker angle is between a first direction of a first speaker viewed from the listener and a second direction of a second speaker viewed from the listener;

calculating a degree of priority of the each speaker of the plurality of speakers based on the generated voices, wherein the degree of priority is calculated subsequent to a failure to arrange the plurality of speakers in the virtual space with the inter-speaker angle between two adjacent speakers of the plurality of speakers greater than or equal to the specific minimum angle; and adjusting, based on the calculated degree of priority, a fourth location of at least one second speaker of the plurality of speakers in the virtual space to make the inter-speaker angle between first priority speakers, of the plurality of speakers, greater than or equal to the specific minimum angle, wherein a priority of each first priority speaker of the first priority speakers is greater than a specific value.

16. A non-transitory computer-readable medium having stored thereon computer-executable instructions that, when executed by a computer, cause the computer to execute operations, the operations comprising:

generating, based on orientation information, first virtual location information, and second virtual location information, voices of a plurality of speakers, wherein a voice, of the generated voices, corresponding to a speaker of the plurality of speakers is localized at a specific location corresponding to an orientation of a listener, a first location of the listener, and a second location of the speaker, the orientation information includes the orientation of the listener, the first virtual location information includes the first location of the listener in a virtual space, the first location is set by the listener, and the second virtual location information includes the second location of each speaker of the plurality of speakers;

adjusting a third location of at least one first speaker of the plurality of speakers in the virtual space to make an inter-speaker angle greater than or equal to a specific minimum angle, wherein the inter-speaker angle is between a first direction of a first speaker viewed from the listener and a second direction of a second speaker viewed from the listener;

calculating a degree of priority of the each speaker of the plurality of speakers based on the generated voices, wherein the degree of priority is calculated subsequent to a failure to arrange the plurality of speakers in the virtual space with the inter-speaker angle between two adjacent speakers of the plurality of speakers greater than or equal to the specific minimum angle; and adjusting, based on the calculated degree of priority, a fourth location of at least one second speaker of the plurality of speakers in the virtual space to make the inter-speaker angle between first priority speakers, of the plurality of speakers, greater than or equal to the specific minimum angle, wherein a priority of each first priority speaker of the first priority speakers is greater than a specific value.

* * * * *